United States Patent
Nguyen

(10) Patent No.: US 12,524,387 B1
(45) Date of Patent: Jan. 13, 2026

(54) FAST BATCH-STYLE LOOKUP, AGGREGATION, AND FORMULA PROCESSING SYSTEM FOR A MULTIDIMENSIONAL SPACE

(71) Applicant: Workday, Inc., Pleasanton, CA (US)

(72) Inventor: Ngoc Nguyen, Cupertino, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/229,568

(22) Filed: Aug. 2, 2023

(51) Int. Cl.
*G06F 16/22* (2019.01)
*G06F 16/2455* (2019.01)

(52) U.S. Cl.
CPC ...... *G06F 16/2264* (2019.01); *G06F 16/2246* (2019.01); *G06F 16/24556* (2019.01)

(58) Field of Classification Search
CPC .......... G06F 16/2264; G06F 16/2246; G06F 16/24556
USPC .......... 707/741, 768, 769, 771, 968
See application file for complete search history.

(56) References Cited

U.S. PATENT DOCUMENTS

| | | | |
|---|---|---|---|
| 6,003,036 A * | 12/1999 | Martin | G06F 16/283 707/999.005 |
| 6,778,977 B1 * | 8/2004 | Avadhanam | G06F 16/2246 707/800 |
| 11,409,725 B1 * | 8/2022 | Goyal | G06F 16/2282 |
| 2019/0095187 A1 * | 3/2019 | Benedek | G06F 9/44521 |
| 2020/0218506 A1 * | 7/2020 | Nilsson | G06F 16/245 |
| 2020/0218735 A1 * | 7/2020 | Nilsson | G06F 16/56 |
| 2022/0318147 A1 * | 10/2022 | Anand | G06F 16/21 |

* cited by examiner

*Primary Examiner* — Phong H Nguyen
(74) *Attorney, Agent, or Firm* — Van Pelt, Yi & James LLP

(57) ABSTRACT

A system, method, and device for evaluating a query is provided. The method includes (i) receiving a query that is indicative of one or more properties of result data, (ii) determining, based at least in part on the query, one or more partitions of a hypercube that are expected to comprise information used in generating result data for a response for the query; (iii) generating a data structure comprising a set of data of the one or more partitions, wherein the data structure is indicative of relationships among data in the set of data; (iv) evaluating the query with respect to the plurality of account groups; and (v) using the data structure to determine the result data based at least in part on an evaluation of the query with respect to the plurality of account groups.

26 Claims, 16 Drawing Sheets

```
message MatrixRequest {
  // list of dimensional spaces
  repeated IRollupElement rollupElements = 1;  // 302
  // list of time elements
  repeated ITimeElement timeElements = 2;  // 304
  // Ids of all the currencies that the data will be converted to.
  repeated int32 currencyIds = 3;  // 306
}
```

FIG. 3A

| Column 0, Size = S0 = 6 |
|---|
| 0 |
| 1 |
| 2 |
| 3 |
| 4 |
| 5 |

| Column 1, Size = S1 = 5 |
|---|
| 10 |
| 20 |
| 30 |
| 40 |
| 50 |

| Column 2, Size = S2 = 8 | |
|---|---|
| 100 | 6 |
| 100 | 7 |
| 200 | 6 |
| 200 | 8 |
| 300 | 7 |
| 400 | 6 |
| 400 | 7 |
| 400 | 9 |

Key combo at id = i

| Col_0[((i/S2)/S1)%S0] | Col_1[(i/S2)%S1] | Col_2[i%S2][0] | Col_2[i%S2][1] |
|---|---|---|---|

FAST BATCH-STYLE LOOKUP, AGGREGATION, AND FORMULA PROCESSING SYSTEM FOR A MULTIDIMENSIONAL SPACE

BACKGROUND OF THE INVENTION

Query evaluation systems, which capture and model future outcomes, are typically built based on multi-dimensional databases, usually called hypercubes to facilitate analysis. Data in a hypercube is associated with a coordinate tuple, having a value in each of a set of defined dimensions. Dimensions used in planning are usually hierarchical in nature. Dimensions can have attributes which are also often hierarchical. Parent elements represent the rollup, or aggregation, of all of the elements "beneath" them in the hierarchy. Some of these hierarchies can be quite high and/or wide (a single parent may represent a rollup of thousands or even millions of children). Query evaluation systems have long had challenges dealing with large and complex models, especially when the amount of data in hypercubes is increasing.

BRIEF DESCRIPTION OF THE DRAWINGS

Various embodiments of the invention are disclosed in the following detailed description and the accompanying drawings.

FIG. 3A is an example of describing an ad hoc multidimensional request in a query according to various embodiments of the present application.

FIG. 9A is an example of a data space according to various embodiments of the present application.

FIG. 9B is an example of a key combination for a particular point in a data space according to various embodiments.

DETAILED DESCRIPTION

Figure 1:
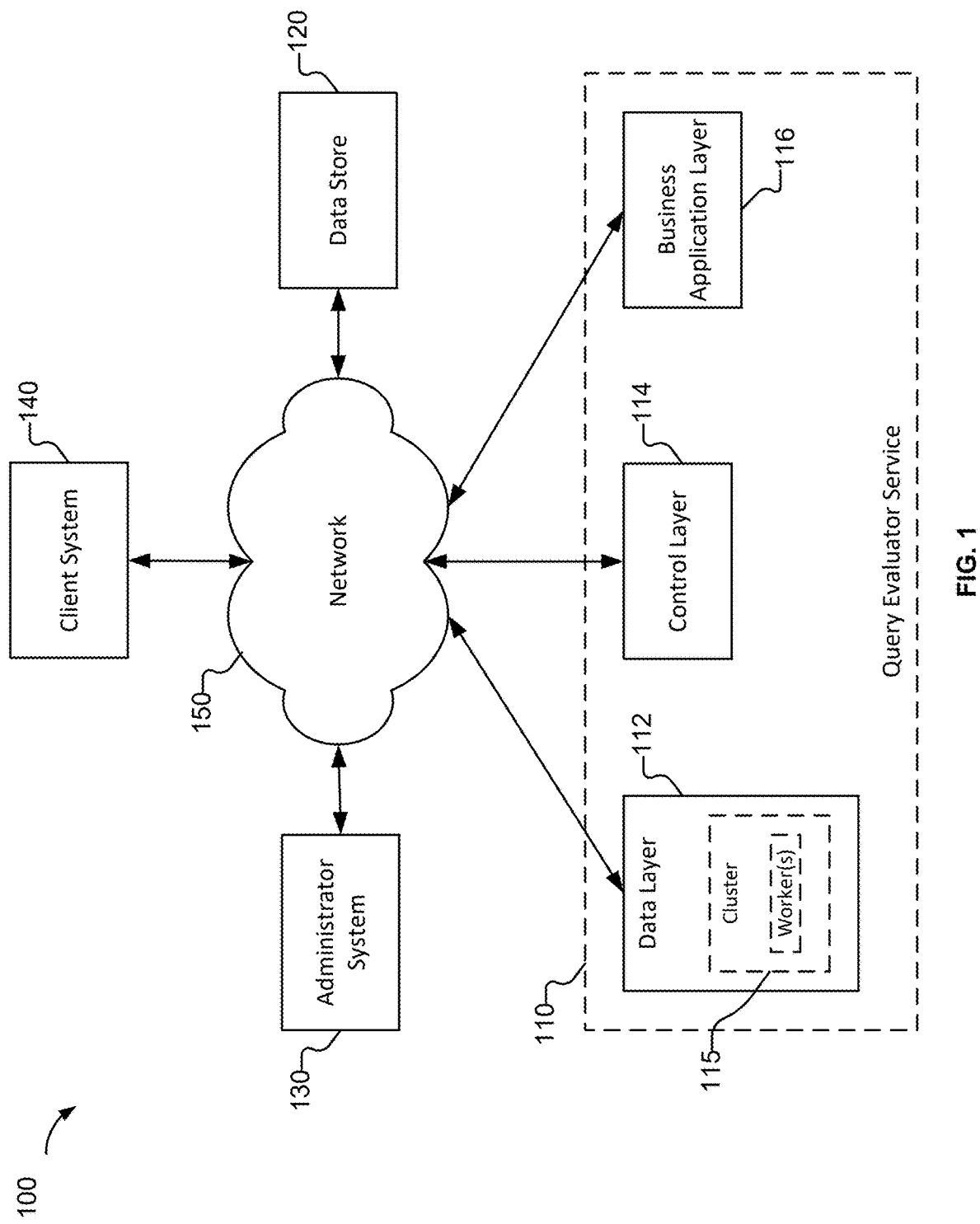
FIG. 1 is a block diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a metric account may include an account comprising a formula. The value of the account at any location including dimension/hierarchy/rollup locations is obtained based on evaluating the formula at that location.

As used herein, an aggregable account may include an account for which the value of the account at a given location is the aggregation of data of this account at all the leaf locations under the given location.

As used herein, a closed pattern formula may be a formula that refers to some accounts and can only be evaluated to non-empty on the space for which at least a subset of the accounts has data. In some embodiments, a closed pattern formula must be evaluated to empty on the locations of the space for which the accounts in the formula are empty. An example of a closed pattern formula is Fx=Account A+Account B.

As used herein, an open pattern formula may include a formula that can be evaluated to non-empty on a location that has no data. An example of an open pattern formula is Fx=100. Another example of an open pattern formula is Fx=1−Account X*2.

For a query evaluation system to be viable, it has to be capable of running potentially large reports (e.g., queries) quickly. An ad hoc report allows users to dissect/query data across dimensions and attributes. A report that contains 3 dimensions that has 1000 values each would potentially produce 1 billion cells. A report that contains 3 dimensions that has 10000 values has the potential space of 1 trillion cells. Coordinates within a report often have relationships with each other, such as a given coordinate is a parent of other coordinates. The scale of data used in generating ad hoc reports creates a heavy workload to process the numerous values within the dataset. Related art systems generally require users to have a high level of sophistication to define the particular intersections of data in the dataset (e.g., the hypercube) to be queried. Further, related art systems are inefficient and perform redundant calculations for values on which different accounts depend. Various embodiments solve the deficiencies of related art systems by (i) providing an intuitive query evaluation service in which users describe the attributes of responsive data rather than being required to define the particular intersections of the dataset to be queried, (ii) evaluating a query by deconstructing the query into a set of requests that are independent and can be processed in parallel, and (iii) storing in memory (e.g., a local memory) computations on which a plurality of accounts depend to reduce/eliminate the duplicative computations performed by the related art systems.

Various embodiments provide a query evaluation service/system or method of processing queries with respect to data stored in a dataset (e.g., a hypercube) that enables virtually no limits-unlimited dimensions, dimension values, and numbers of scenarios to be created easily and calculated rapidly. The system may represent a model (e.g., a user's or customer's data model) in a data structure which contains numeric data, formulas, and rules. The data structure can represent a hypercube having high dimensionality without taking up much memory. The system creates indexes, dynamic caches, and dependencies between data which enables rapid calculation of values at any single coordinate. In some embodiments, the system only recalculates dependent changes after users update their model. Data at a single coordinate can be a literal number that a user entered or a result of rules or formula execution or an aggregation of data from other coordinates.

Various embodiments provide a system for fast and flexible ad hoc queries to a query engine comprising more than two dimensions. The system comprises a query engine and a formula evaluator. The query engine accepts queries that specify a range of values in a hierarchy of at least two dimensions and produces a normalized query. The query engine processes queries comprising more than two dimensions. The execution engine accepts the normalized query and retrieves data stored within each dimensional hierarchy. The execution engine executes a normalized query of more than two dimensions. The formula evaluator evaluates a formula on any intersection within a space of more than two dimensions. In some embodiments, the query indicates a unit of measure for a dimension of the result data. In some embodiments, the query defines one or more boundary conditions for the result data.

According to various embodiments, the system is configured to receive a query that describes an ad hoc report (e.g., instead of a list of specific coordinates type of query) and process this query rapidly. Related art query evaluation systems use queries that define all intersections/data points to be evaluated. In contrast, queries according to various embodiments are relatively smaller queries that describe the dimensional space intersections.

Various embodiments include a system, device, and method for evaluating a query. The method includes (i) receiving a query that is indicative of one or more properties of result data, (ii) determining, based at least in part on the query, one or more partitions of a hypercube that are expected to comprise information used in generating result data for a response for the query; (iii) generating a data structure comprising a set of data of the one or more partitions, wherein the data structure is indicative of relationships among data in the set of data; (iv) evaluating the query with respect to the plurality of account groups; and (v) using the data structure to determine the result data based at least in part on an evaluation of the query with respect to the plurality of account groups.

Various embodiments include a system or a method for processing queries comprising more than two dimensions with a query engine (e.g., a query evaluator service). The method includes (i) accepting a query that specifies, for each dimension referenced in the query, a dimension identification and at least one dimension value, with a range specifying how the at least one value expands hierarchically, (ii) generating a normalized query, and (iii) dividing the normalized query into independent subqueries (e.g., a set of requests), each of which may be executed in parallel by the query engine. The normalized query is generated by (a) scanning for one or more elements of the hierarchical ranges that may be combined, (b) sorting hierarchical ranges by depth, and (c) pruning any elements of a hierarchical range that are descendants of another element of the same hierarchical range.

Various embodiments include a system or a method for executing a normalized query of more than two dimensions with a query engine. The normalized query is divided into a set of subqueries (e.g., set of requests). Executing the normalized query includes executing, for each subquery, the following steps (i) identifying all filters for each dimension referenced in the subquery; (ii) for each leaf account value within each subquery: (a) finding rows of leaf data by applying the filters, (b) iterating through the leaf data, and recording leaf data with a label for each item of leaf data in a pool, (c) expanding from leaf levels up into the hierarchy to find data associated with higher level nodes required in the normalized query, and (d) aggregating accounts as indicated in the normalized query by aggregating the leaf data and higher level node data into a response.

Various embodiments include a system or a method for evaluating formulas on any intersection within a space of more than two dimensions. The method includes (i) creating a matrix query for each node within a formula expression tree within the space of more than two dimensions, (ii) executing the matrix query at each node within the formula expression tree, and (iii) applying an arithmetic expression to the result set of each node.

Table 1 provides a contrast between various embodiments and related art systems for evaluating a query. The Cartesian product of two sets A and B is the set of all ordered pairs (a,b), where a is in A and b is in B. The Cartesian product can involve any number of sets. As used herein, Cartesian elements are the operand sets in the Cartesian product—for example, set A is a Cartesian element, and set B is a Cartesian element.

TABLE 1

| Query evaluation system according to various embodiments | Related art query evaluation systems |
|---|---|
| Accepts small query that describes the dimensional space of responsive data. | Accepts a query that identifies the specific intersections of Cartesian elements in the hypercube that correspond to responsive data.<br>Identifies all the Cartesians from the request upon receipt of the query, which is both time and memory intensive (e.g., a request with 3 dimensions that each have 1000 values will make up 1 billion combinations). |
| Performs few lookups, such as 1 lookup per account, which is less than the number of lookups of related art systems thereby resulting in a faster response time. As an example, if a query requests all data of the account Expense under Engineering, the system processes the data and performs only 1 lookup, which is to find all leaf data of Expense under Engineering. | Performs lookup at each combination of the dimensions. Using the example above, 1 billion combinations (e.g., coordinates in the hypercube) require 1 billion evaluation processes.<br>The evaluation process is complicated, including logic checking, cache lookups, and data lookups for each dimensional space, then intersects the dimensional spaces and scans through leaf rows of data to resolve the formula if needed.<br>For each coordinate, the system needs to look up data that belongs to different dimensional spaces and intersects the dimensional spaces.<br>As an example, if a query requests all data of the account Expense under Engineering, the system slices and dices the data by Region and Product, and generates a coordinate list that would be all Cartesian elements of everything under Engineering, Region, and Product, such as Coordinate(Quality Assurance, US, Toy), Coordinate(Quality Assurance, UK, Car), etc |
| The system does not process empty coordinates in the hypercube, thereby resulting in a faster response time. | Hypercubes having high dimensionality are likely to have many empty coordinates, and related art systems evaluate the query at all empty coordinates. |
| The system takes advantage of the hierarchical relationship between elements (e.g., coordinates in the hypercube) within a query to eliminate repeating the same computational work, thereby resulting in faster response times. | Processing N coordinates that belong to a single account independently has a lot of overlapping computational work because the coordinates in the query space have relationships and by processing each coordinate independently, the related art system is unable to share common computational work. |

FIG. 1 is a block diagram of a network system according to various embodiments of the present application. In some embodiments, system 100 implements system 200 of FIG. 2. In some embodiments, system 100 implements process 400 of FIG. 4, process 500 of FIG. 5, process 600 of FIG. 6, process 700 of FIG. 7, process 800 of FIG. 8, process 1000 of FIG. 10A, process 1025 of FIG. 10B, process 1050 of FIG. 10C, and process 1200 of FIG. 12.

In the example illustrated in FIG. 1, system 100 includes query evaluator service 110, client system 140, and/or administrator system 130. System 100 may additionally include one or more data stores, such as data store 120, and network 150 over which one or more of query evaluator service 110, client system 140, administrator system 130, and data store 120 are connected. In some embodiments, query evaluator service 110 is implemented by a plurality of servers. In various embodiments, network 150 includes one or more of a wired network and/or a wireless network such as a cellular network, a wireless local area network (WLAN), or any other appropriate network. System 100 may include various other systems or terminals.

In some embodiments, query evaluator service 110 is configured to (a) receive a query that is indicative of one or more properties of result data, (b) determine, based at least in part on the query, one or more partitions of a hypercube that are expected to comprise information used in generating result data for a response for the query, (c) generate a data structure comprising a set of data of the one or more partitions, wherein the data structure is indicative of relationships among data in the set of data, (d) use the data structure to evaluate a plurality of account groups comprising values used to evaluate the query, and (e) evaluate the query based at least in part on an evaluation of the plurality of account groups.

In various embodiments, query evaluator service 110 processes workloads, such as at scale for big data evaluations across datasets that are sparsely populated (e.g., datasets having significantly large dimensionality). Query evaluator service 110 is configured to receive one or more queries (e.g., business logic to be executed) from another system, such as client system 140. In response to receiving the one or more queries, query evaluator service 110 (e.g., control layer 114) determines one or more datasets storing data for which the other system is seeking to evaluate. In response to determining the dataset(s), query evaluator service 110 obtains business logic to be executed (e.g., in connection with evaluating/analyzing the data). In some embodiments, query evaluator service 110 deconstructs the query to determine a set of partitions of the hypercube that are expected to store relevant data (e.g., data relevant to providing a response to the query). In response to determining the set of partitions, query evaluator service 110 generates a plurality of calls (e.g., a set of requests or subqueries) to be evaluated against the dataset for the set of partitions. For example, query evaluator service 110 evaluates queries against only those partitions of the hypercube that are expected to store relevant data. Accordingly, by not evaluating the query against the entirety of the hypercube, query evaluator service 110 provides a very efficient mechanism for evaluating a query. Query evaluator service 110 is further configured to execute the business logic (e.g., evaluating a formula on cells). In connection with executing the business logic, query evaluator service 110 may configure the requisite infrastructure to be used during the execution, including configuring and establishing the connections between the compute resource(s) (e.g., cluster(s) of compute resource(s)) and the applicable data store(s), pooling compute resource(s) (e.g., according to a compute resource allocation strategy), configuring the compute resource(s), and causing the compute resource(s) to execute the business logic.

In some embodiments, query evaluator service 110 comprises data layer 112, control layer 114, and/or business application layer 116. Data layer 112, control layer 114, and/or business application layer 116 are respectively implemented by one or more servers. In some embodiments, data layer 112 comprises one or more clusters of compute resources.

Data layer 112 obtains a query received by query evaluator service 110 and processes the query to provide result data, such as in the form of a report. Data layer 112 receives the query, divides the query into a set of requests, processes at least a subset of the set of requests in parallel, and generates result data that is responsive to the query based on results for the set of requests. As an example, the set of requests comprises requests (e.g., subqueries) that are independent (e.g., the various requests do not have cross dependencies). Each request may correspond to one or more account groups. The plurality of account groups corresponding to the plurality of requests in the set of requests are independent and without a dependency across any two account groups in the plurality of account groups. The processing the at least the subset of the set of requests in parallel includes evaluating a formula on any associated intersection within a space of more than two dimensions. As an example, at least a subset of the set of requests comprises requests (e.g., subqueries) that are independent (e.g., the various requests do not have cross dependencies).

In some embodiments, data layer 112 comprises a query engine, an execution engine, and a formula evaluator.

The query engine (e.g., an interpretive engine) is a service that receives a query, pre-processes the query, and divides the query into a set of requests (e.g., independent subqueries). The query engine is configured to accept a query that is indicative of at least one or more properties of the result data. For example, the query specifies, for each dimension referenced in the query, a dimension identification (e.g., for a dimension for which the query user wants data), and at least one dimension value, with a range specifying how the at least one value expands hierarchically. An example of a query includes a matrix request that defines an entity with which the result data for the query intersects, a time element that specifies the intersection over the time dimension, a formula for evaluating the data at the intersections, and currencies to convert the result to. Related art systems require that users specify exactly the intersections where data responsive to the query is located. However, query evaluator service 110 is configured to receive queries that broadly request a subset of data intersected with one or more other intersections of data without specifically identifying the location of the result data.

The query engine analyzes the query to determine Cartesian elements and identify roll up elements that overlap and removes the overlapping elements to ensure each element is only computed once. The query engine uses the dependency of data to determine subqueries and to schedule some subqueries to run in parallel. The unit of parallelization of the subqueries may be based on the dimension of the account being analyzed.

In response to obtaining the query, the query engine is configured to determine relationships between data points that are invoked in evaluating the query, and determine an optimal execution plan to retrieve and compute all the data query. Optimizing the computation time comprises optimizing (e.g., with respect to a cost function) the computation time for evaluating the query, or otherwise minimizing the work to evaluate the query. In some embodiments, the query engine generates a normalized query. The query engine may normalize the query to optimize the extent to which the query (e.g., the subqueries into which the normalized query is divided) includes only distinct, non-overlapping dimensional spaces (e.g., hypercube partitions). Generating the normalized query includes scanning through each element (e.g., each Cartesian element) in the request to group the elements by dimension, and for each dimension, scanning through all values to normalize them to ensure that items that have ancestor-descendant relationships belong to the same group. For example, the query engine scans for one or more elements of the hierarchical ranges that may be combined, sorts the hierarchical ranges by depth, and prunes any elements of a hierarchical range that are descendants of another element of the same hierarchical range.

An example of the grouping of the elements by dimension based on scanning through the elements includes combining the two Cartesian elements (US, ExpandAll) and (US, TopAndChildren) into a single grouping of (US, ExpandAll). Because the elements defined by TopAndChildren are contained within the elements defined by ExpandAll, the elements can be grouped into a single element.

When the customer creates a data model, the user defines a tree structure or flat structure for each dimension. The user then inputs data at the any combination of leaf dimension values—for example, the user enters 1000 for account Expense, at Region SF, level Dev for 01/2000 (Expense, SF, Dev are leaf dimension values). Data at a parent coordinate is an aggregation of data at leaf coordinates under that parent coordinate. For example, US is a rollup dimension value (e.g., as it has children such as CA, NY, etc.) in the Region dimension, and to obtain aggregated data for the US, data for elements within the hierarchy that are children of the US can be rolled up and aggregated. The data model and query allow the user to query data at any ad hoc rollup dimension value such as Europe and CA (e.g., there is no node in the Region tree that has Europe and CA as children). The query can specify the roll ups to perform, such as by indicating the dimension identifier associated with the desired custom roll up element.

An example of the sorting of the elements (e.g., the hierarchical ranges by depth) identified by the grouping of elements by dimension includes sorting six Cartesian elements of the dimension Region, the six Cartesian elements corresponding to UK (e.g., depth=2 corresponding to the levels of Europe and UK), San Francisco (e.g., depth=4 corresponding to the levels of North America, US, California, and San Francisco), California (e.g., depth=3 corresponding to the levels of North America, US, and California), Europe (e.g., depth=1 corresponding to the level of Europe), North America (e.g., depth=1 corresponding to the level of North America), and US (e.g., depth=2 corresponding to the levels of North America and US). Accordingly, the elements are sorted in the following order: Europe (depth=1), North America (depth=1), UK (depth=2), US (depth=2), California (depth=3), and San Francisco (depth=4).

An example of pruning any elements of a hierarchical range that are descendants of another element of the same hierarchical range includes scanning through the sorted elements, determining whether an element is a descendant of a previous element, and if the element is a descendant of the previous element, skipping the element (e.g., because the element will be grouped with the previous elements), and if the element is not a descendant of the previous element, deeming the current element to be a new grouping. Using the example above, the query engine determines two groupings: Group 1=Europe (e.g., which includes data for elements Europe and UK) and Group 2=North America (e.g., which includes the top value for North America, and all expanded values of US, which in turn includes the values for California and San Francisco).

In response to determining the normalized query (e.g., the grouping of Cartesian elements), the query engine generates a set of corresponding subqueries (e.g., a set of requests for each grouping). Each request is a sub-request of the original query. Because the set of requests is determined based on the sorting and grouping of Cartesian elements invoked by the query, the requests correspond to non-overlapping and independent groups of data. The independency of the set of requests enables query evaluator service 110 (e.g., data layer 112, such as via cluster 115) to execute the set of requests (or a subset thereof) in parallel. Creating the request includes, for each group of account Cartesian elements (e.g., Group 1 or Group 2 from the example above), creating a request with the particular account Cartesian element and all other Cartesian elements (e.g., time, currency, etc.).

In response to determining the set of requests, the query engine generates a set of tasks respectively corresponding to the set of requests. The query engine submits the tasks for evaluation. For example, the query engine causes the tasks to be submitted to the execution engine for execution. In some implementations, the parallelization of the set of requests is determined by the query engine. In other implementations, the parallelization of the set of requests may be determined/managed by the execution engine.

In response to processing the query to specify data space with no overlaps/redundancy, and grouping the elements to be evaluated for parallelization, query evaluator service 110, within a parallelization of the requests, identifies all cells in the data space that has data for the specified computation (e.g., defines a data structure), creates a manner to store each level of roll up to minimize the amount of repeat calculations (e.g., creates a leaf pool), and stores unique combinations in the leaf pool. When the leaf data (e.g., the unique calculations) is stored in the leaf pool, the leaf data is organized so that leaf data is grouped according to leaf levels. Query evaluator service 110 implements a bottom-up evaluation approach by starting with data and determining the aggregation values to be used for roll-up values. For sparse hypercubes, the aggregation of data from leaf data comprised in the leaf pool and remembering (e.g., indexing) where the data originated from may reduce the number of calculations over a data span. In some embodiments, evaluating the query with respect to the plurality of account groups comprises: 1) computing a plurality of roll-up values based on values for one or more leaves or nodes in the data structure; 2) determining at least a subset of the plurality of roll-up values that corresponds to unique combinations of one or more leaves or nodes of the data structure; and 3) storing, in a leaf pool, the subset of the plurality of roll-up values corresponding to the unique combinations of the one or more leaves or nodes. In some embodiments, evaluating the query with respect to the plurality of account groups includes 1) for each roll-up value to be computed, determining whether the roll-up value is dependent on one or more previously computed roll-up values stored in a leaf pool; and 2) in response to determining that the roll-up value is dependent on the one or more previously computed roll-up values stored in the leaf pool, retrieving the one or more previously computed roll-up values from the leaf pool and computing the roll-up value based at least in part on the one or more previously computed roll-up values.

The execution engine is a service that executes the query, such as by executing the set of requests associated with the tasks submitted by the query engine. The execution engine evaluates each request of the set of requests and aggregates the data to obtain a response to the query (e.g., in accordance with the definition of the normalized query obtained by the query engine). The execution engine may generate a data structure for the particular partition (e.g., the dimensional/data space) defined by the particular request being executed. The data structure may be stored in memory (e.g., local memory) for quick evaluation. As the execution engine evaluates the request, the execution engine stores data evaluated at cells within the data structure to a leaf pool, which may be accessed for evaluating data at other cells that are dependent on such values. The data stored in a leaf pool may comprise, or be stored in association with, metadata providing indexing or context indicating an origin of a leaf node data (e.g., where/how the value was determined).

The execution engine is configured to identify the filters (e.g., all filters) for each dimension referenced in a particular request and determine the leaf accounts invoked within the particular request. For each leaf account value within the particular request, the execution engine finds rows of leaf data by applying the filters, iterates through the leaf data, records leaf data with a label to the leaf pool, expands from leaf labels to parent labels, expands from leaf levels to parent levels up into the hierarchy to find data associated with higher level/label nodes required in the normalized query. The label, which is recorded in the leaf pool for each leaf data row, contains the values of the dimensions from the request that this data is originated. For example, a given leaf data at level Dev, Region SF, Product A will be recorded to the leaf pool with level=Dev, and label=(Region=SF) if the query asked for the Cartesian product of level and region for this account. Data for multiple levels can have the same label and the leaf pool keeps a set of distinct labels so that the work of finding parent "labels" for a given leaf label only needs to be performed once. The execution engine may call the formula evaluator to evaluate a formula to obtain the corresponding leaf node value. In response to obtaining the values for the leaf nodes in all the corresponding leaves (e.g., levels, labels, etc.) for the request, the execution engine aggregates the accounts in accordance with (e.g., as defined by) the normalized query or corresponding request/subquery. The execution engine aggregates the leaf data and higher-level leaf node data to obtain a response (e.g., result data for the query).

The execution engine determines a data structure comprising various leaf accounts or leaf nodes. As used herein, a Cartesian group, once expanded is a set of elements that will participate in the Cartesian product with other Cartesian groups. In some embodiments, the rolling up of a leaf account includes (a) converting the value of each Cartesian group into a filter; (b) identifying all leaf data that satisfies the filters (e.g., each leaf comprises one row per combination of leaf level and dimension/attribute values, and this combination is one element in the result set of the Cartesian product of all the Cartesian groups); (c) iterating through all the identified leaf data and resolving the applicable formula, if needed, and storing all the leaf data into a leaf pool with its values of the dimension/attributes in the Cartesian groups, where each row has an index in the leaf pool (e.g., in the leaf pool, at index 0, level is Marketing, (Product, Region) comboId is 1 which is for (Barbie, CA) and the distinct combos of (Product, Region) set has size 2 which contains (Car, NY), (Barbie, CA), and row data at index 0 is [1000,2000]); (d) expanding all the recorded values of each dimension/attribute column as specified by the expansion type of each Cartesian group (e.g., for column Product, the system hase (Barbie, Car, Toy), and for column Region, the system has (CA, NY, US, Worldwide); (e) in response to determining that the request comprises dimension/attribute elements, the execution engine finds the Cartesian products of the expanded values of dimension/attributes columns and creates a map whose keys are the elements in the Cartesian product result set and values are the indexes of rows that have dimension/attribute combos that are rolling up to the corresponding combo in the key; (f) expanding the levels in the leaf pool; and (g) for a given rollup combination of level and dimension/attribute values, it has a set of indexes of rows in the leaf pool that are rollup up to it, and the system aggregates data of those rows to get the value for the given rollup location.

The formula evaluator is a service for resolving a formula, such as an arithmetic expression, with respect to identified cells in the data structure (e.g., the dimensional space for a query). For example, the formula evaluator evaluates formulas on any intersection within a space of more than two dimensions. Evaluating the formula includes: (a) creating a matrix query for each node within a formula expression tree within the space of more than two dimensions (e.g., within the dimensional space for the query), (b) executing the matrix query at each node within the formula expression tree, and (c) applying an arithmetic expression to the result set of each node. The formula evaluator may determine or classify whether a formula to be evaluated comprises an open pattern formula or a closed pattern formula, and correspondingly implements an open pattern formula evaluation process or a closed pattern formula evaluation process to evaluate the formula. In some embodiments, evaluating the query with respect to the plurality of account groups includes determining one or more formulas in the query and classifying a pattern for each of the one or more formulas. In some embodiments, for each of the one or more formulas, the system determines whether the pattern is a closed pattern or an open pattern and in response to determining that the pattern is an open pattern, executing the formula, and in response to determining that the pattern is a closed pattern, determining one or more accounts on which the formula depends and apply a unary or binary operation on top of children data for the operation.

A metric account is an account that has no user input and instead has a formula, and the value of the metric account at any given location in the data space is the result of evaluating the formula at that location. One example of this is a given metric account X with formula=A/B, and accounts for US, California, and New York (e.g., account for region US has two children—the account for California and the account for New York). The account for region California may have an account A that is empty and an account B=2; the account for region New York may have an account A=20 and an account B=3. Resolving the formula X for each of these accounts results in: at region=California, account X=Account A [for region-California]/Account B [for region-California]=0; at region=New York, account X=Account A [for region=New York]/Account B [for region=New York] =20/3=6.67; for region=US, account X=Account A [for region=US]/Account B [for region=US]=(Account A [for region=California]+Account A [for region=New York])/(Account B [for region=California]+Account B [for region=New York])=(0+20)/(2+3)=4.

A constant formula is an open pattern formula that is evaluated to the same value at any location. An example of an open pattern formula is Fx=100. According to various embodiments, for each request, the formula evaluator evaluates the open pattern formula on a multi-dimensional space by (i) creating a key space, which is an encapsulation of all locations of the intersections of all the dimensional spaces that are the Cartesian products of all the set of dimensions/attributes/levels from the request. (ii) creating a result row that is the encapsulation of the values for a particular location in the key space—for example, [100, 100,100] to represent for data of a given location for Jan2000, Qtr1_2000, Year2000, and also creating a result row space that is the encapsulation for the result of all the rows in the key space; (iii) creating a grid that is the encapsulation of all locations and values of each location in the key space for the particular request.

Creating the key space for a particular request includes scanning through all the level/level attribute/dimension/dimension attribute values and grouping the level attribute elements with the level element and grouping dimension attributes with the corresponding dimension. Each level has its value for each level attribute, and each dimension has its value for each dimension attribute. The formula evaluator obtains N groups after the scanning and grouping step. The Cartesian product of N groups will be all valid locations. Each group can be a single dimension or attribute element or a composite group in which a dimension is grouped with its dimension attributes, or a level grouped with its level attributes.

In response to obtaining the N groups, for each of the N groups, the formula evaluator expands the main Cartesian element to find all its values. If the particular group is a composite group, then the Cartesian element is expanded only for the particular dimension or level, and not expanded for their particular attributes. If the particular group is a composite, then for each attribute in the particular group, the formula evaluator finds the attribute value for the corresponding dimension value or level and finds all the expanded values based on the corresponding request.

The formula evaluator generates the key space that contains N columns (e.g., a column for each group). The key space captures all the coordinates which are the Cartesian product of all the columns without actually spending the time and memory to list out all the combinations that are the result of the Cartesian product.

A closed pattern formula refers to some accounts and is evaluated to be non-empty on the locations for which the accounts have data and is evaluated to be empty on the locations for which accounts in the formula are empty. An example of a closed pattern formula is Fx=Account A+Account B. According to various embodiments, for each request, the formula evaluator evaluates the closed pattern formula on a multi-dimensional space by (a) generating a formula tree, (b) finding the root node of the formula tree, (c) traveling down the formula tree, (d) for each node in the formula tree, creating a request that comprises a description of the multi-dimensional space for the applicable account(s) for the node in the formula tree, and (e) applying unary or binary operations (e.g., subtraction, addition, multiplication, etc.) on the grid data from its corresponding children node formula tree.

In some embodiments, a formula may correspond to an almost-closed pattern formula. An almost-closed pattern formula may be a formula equal to a closed pattern formula +/−a constant. The formula evaluator evaluates an almost-closed pattern formula by (a) computing a result for the closed pattern formula portion in the almost-closed pattern formula, (b) computing the constant portion of the almost-closed pattern formula such as by executing the formula assuming that a term to which the formula is referring to is empty, (c) computing the key space for the corresponding request, and (d) creating a Cartesian grid comprising the key space and the respective results of computing the closed pattern formula portion and the constant portion. If the closed pattern formula portion is empty, then the data returned corresponds to the result of computing the constant portion.

Query evaluator service 110 provides the result (e.g., responsive data) for the query to client system 140. For example, query evaluator service 110 uses business application layer 116 to configure a user interface to display the results (e.g., provide a report or a sheet to client system 140), such as in the form of a report.

In some embodiments, data layer 112 manages a cluster of compute resources to execute the business logic of the query (e.g., to process the set of requests/subqueries against the applicable data). For example, data layer 112 establishes the connections between the set of compute resources and the data source(s) and allocates the workload for the business logic across the set of compute resources.

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., log data), etc. Various other applications can be provided by business application layer 116. For example, a user queries data layer 112 by sending a query/request to business application layer 116, which interfaces with data layer 112 and/or data store 120 to obtain information responsive to the query (e.g., business application layer 116 formats the query according to the applicable syntax and sends the formatted query to data layer 112, such as via control layer 114). As another example, an administrator uses an interface provided/configured by business application layer 116 to configure (e.g., define) one or more security policies including access permissions to information stored on data store 120, permissions to access performance profiles, etc.

Administrator system 130 comprises an administrator system for use by an administrator. For example, administrator system 130 comprises a system for communication, data access, computation, etc. An administrator uses administrator system 130 to maintain and/or configure query evaluator service 110 and/or one or more of data stores (e.g., data store 120). For example, an administrator uses administrator system 130 to start and/or stop services on query evaluator service 110 and/or data store 120, to reboot data store 120, to install software on query evaluator service 110 and/or data store 120, to add, modify, and/or remove data on data store 120, etc. Administrator system 130 communicates with query evaluator service 110 and/or data store 120 via a web-interface. For example, administrator system 130 communicates with query evaluator service 110 and/or data store 120 via a web-browser installed on administrator system 130. As an example, administrator system 130 communicates with query evaluator service 110 and/or data store 120 via an application running on administrator system 130.

In various embodiments, an administrator (or other user associated with a tenant or entity with which the tenant is associated such as a customer) uses administrator system 130 to configure a service provided to a tenant. As an example, the administrator uses administrator system 130 to communicate with query evaluator service 110 to configure the service provided to the tenant. For example, administrator system 130 may communicate with query evaluator service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for query evaluator service 110, such as one or more security policies and/or one or more compute resource policies, etc.

Data store 120 stores one or more datasets. In various embodiments, the one or more datasets comprise human resources data, financial data, organizational planning data, or any other appropriate data. In some embodiments, data store 120 stores one or more datasets for a plurality of tenants. For example, data store 120 hosts at least part of a software as a service (e.g., a database storing data for the service) for a plurality of tenants such as customers for a provider of the software as a service. In various embodiments, a tenant comprises an organization such as a company, a government entity, a sub-organization of an organization (e.g., a department), or any other appropriate organization. For example, data store 120 comprises one or more database systems for storing data in a table-based data structure, an object-based data structure, etc. In various embodiments, data store 120 comprises one or more of: a business database system, a human resources database system, a financial database system, a university database system, a medical database system, a manufacturing database system, or any other appropriate system. In some embodiments, data store 120 comprises one or more object-oriented database systems.

According to various embodiments, a user uses system 100 (e.g., a client or terminal, such as client system 140, that connects to query evaluator service 110 via network 150) to define business logic and/or to execute such business logic with respect to data (e.g., one or more datasets) stored on data store 120. For example, a user inputs to client system 140 one or more queries to be run against a dataset. In response to receiving the business logic, query evaluator service 110 uses data layer 112 (e.g., a cluster of compute resources) to execute the business logic (e.g., with respect to data stored by data store 120) and provides a result to the user (e.g., via a user interface provided on client system 140). In some embodiments, the result comprises information or a set of information that is responsive to the execution of the business logic. Query evaluator service 110 may enforce one or more security policies with respect to the result, including restricting access to certain information to which the user associated with client system 140 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a data frame, a report, and/or a sheet.

In some embodiments, data layer 112, control layer 114, and/or business application layer 116 are implemented on a single server or a plurality of servers. For example, data layer 112 and business application layer 116 are different modules running on a same server or set of servers.

Figure 2:
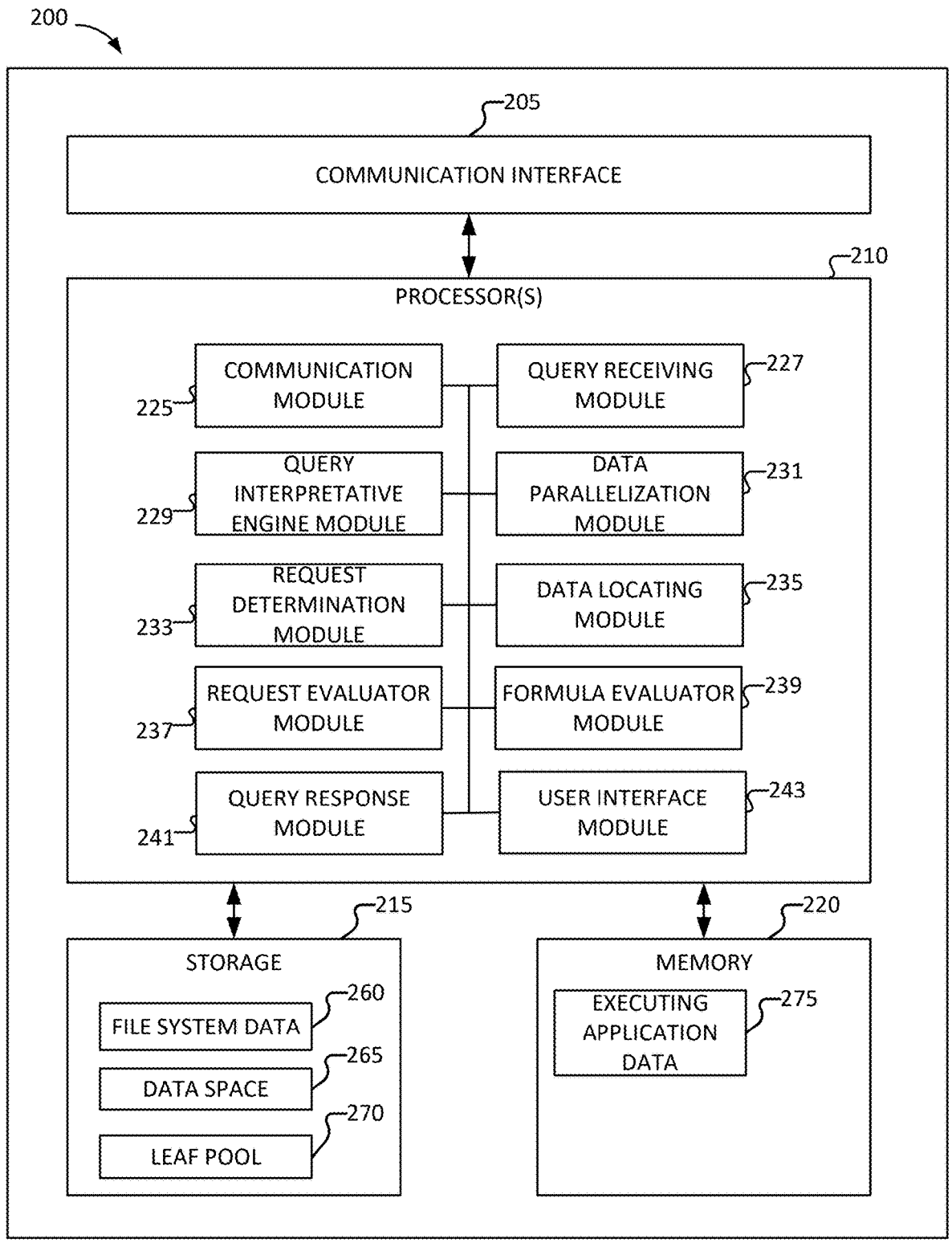
FIG. 2 is a block diagram of a system for providing a query evaluation service according to various embodiments of the present application.

FIG. 2 is a block diagram of a system for providing a query evaluation service according to various embodiments of the present application. In some embodiments, system 200 is implemented at least in part by system 100 of FIG. 1. For example, system 200 may correspond to query evaluator service 110. In some embodiments, system 200 implements process 400 of FIG. 4, process 500 of FIG. 5, process 600 of FIG. 6, process 700 of FIG. 7, process 800 of FIG. 8, process 1000 of FIG. 10A, process 1025 of FIG. 10B, process 1050 of FIG. 10C, and/or process 1200 of FIG. 12. According to various embodiments, system 200 corresponds to, or comprises, a system for processing a query against a sparsely populated hypercube, including (1) receiving logic for a query, (2) determining a set of locations in the hypercube at which data is expected to be stored, (3) generating a set of calls (e.g., requests) based at least in part on the set of locations, (4) communicating the set of calls to a service (e.g., a query evaluator service) that will query the hypercube based on the dataset, (5) obtaining the resulting data from the set of locations, and (6) processing the data to obtain a result for the query.

A multidimensional request often contains intersections of dimensional spaces. Various embodiments accept queries that allow users to easily specify a list of dimensional spaces to be evaluated. Each dimensional space is defined either as a full tree or sub tree in a hierarchy of that dimension or an ad hoc parent node for which children are some random dimension values. The system accepts a query in which each dimensional space is specified through a value and how the user wants to expand under that value. The system also allows ad hoc aggregation through a simple list of dimension value identifiers for which users want to aggregate data. The query enables the system to capture the entire dimensional space in a single request. By taking advantage of the relationship between data points, the system can determine the most optimal execution plan to retrieve data, and compute all the data query.

In the example shown, system 200 implements one or more modules in connection with providing a query evaluator service, such as to enable users to evaluate data on one or more data sources without requiring the users to configure the infrastructure to execute the evaluation. System 200 comprises communication interface 205, one or more processors 210, storage 215, and/or memory 220. One or more processors 210 comprises one or more of communication module 225, query receiving module 227, query interpretive engine module 229, data parallelization module 231, request determination module 233, data locating module 235, request evaluator module 237, formula evaluator module 239, query response module 241, and/or user interface module 243.

In some embodiments, system 200 comprises communication module 225. System 200 uses communication module 225 to communicate with various client terminals or user systems such as a user system (e.g., client system 140) or an administrator system (e.g., administrator system 130), or other layers of system 100 such as a data layer 112, business application layer 116, data store 120, etc. For example, communication module 225 provides to communication interface 205 information that is to be communicated. As another example, communication interface 205 provides to communication module 225 information received by system 200. Communication module 225 is configured to receive one or more queries or requests to execute business logic (e.g., requests for processing workloads, servicing queries, etc.) such as from various client terminals or user systems (e.g., from the terminals or systems via a business application layer). The one or more queries or requests to execute tasks are with respect to information stored in one or more datasets (e.g., data stored in data store 120). Communication module 225 is configured to provide to various client terminals or user systems information such as information that is responsive to one or more queries or tasks requested to be executed (e.g., user interfaces comprising reports for the results). In some embodiments, communication module 225 provides the information to the various client terminals or user systems in the form of one or more data frames, reports (e.g., according to a predefined format or to a requested format), and/or via one or more user interfaces (e.g., an interface that the user system is caused to display).

In some embodiments, communication module 225 is configured to receive information pertaining to a workload or data to be analyzed. Examples of information received by communication module 225 include one or more hints (e.g., information pertaining to parameters of data to be analyzed), business logic, etc. Communication module 225 may also be configured to receive information pertaining to capacity/availability of compute resources. For example, a communication module 225 interfaces with a cloud service provider (e.g., a host such as Microsoft Azure, Amazon Web Services, etc.) to obtain information pertaining to availability of compute resources, pricing for obtaining spot market compute resources, etc. In some embodiments, communication module 225 is configured to communicate results of the workload processing. For example, communication module 225 sends the results to a user such as via a user interface of a client terminal.

In some embodiments, system 200 comprises query receiving module 227. System 200 uses query receiving module 227 to receive a query, such as from a user operating a client terminal (e.g., client system 140).

In some embodiments, system 200 comprises query interpretive engine module 229. Query interpretive engine module 229 may be implemented by the query engine described in connection with system 100. System 200 uses query interpretive engine module 229 to interpret the query to determine relationships between data points that are invoked in evaluating the query, and determine an optimal execution plan to retrieve and compute all the data query. Query interpretive engine module 229 may generate a normalized query and determine a set of non-overlapping dimensional spaces, such as by using data parallelization module 231 to ensure a grouping of elements so that the element's ancestor-descendant relationships with respect to each other are comprised in the same group. For example, data parallelization module 231 determines groupings of elements in the dimensional space invoked by the query so that the groups are independent (e.g., can be processed independent from each other).

In some embodiments, system 200 comprises request determination module 233. System 200 uses request determination module 233 to generate a set of requests (e.g., subqueries) for each of the groupings identified from the normalized query.

In some embodiments, system 200 comprises data locating module 235. Data locating module 235 may be implemented by the execution engine described in connection with system 100 of FIG. 1. System 200 uses data locating module 235 to determine the locations of data in the hypercube that are invoked by each request. As an example, for reach request, data locating module 235 generates a data structure in memory (e.g., a data space for the request). The data structure may comprise an element of each of the locations in the hypercube applicable for a particular request and may be indicative of the relationships between the elements in the data structure.

In some embodiments, system 200 comprises request evaluator module 237. Request evaluator module 237 may be implemented by the execution engine described in connection with system 100 of FIG. 1. System 200 uses request evaluator module 237 to evaluate each of the set of requests. Request evaluator module 237 may call/invoke formula evaluator module 239 to evaluate a formula on a particular location in the data structure. As request evaluator module 237 evaluates the request, request evaluator module 237 stores data evaluated at cells within the data structure to leaf pool 270, which may be accessed for evaluating data at other cells that are dependent on such values. The data stored in leaf pool 270 may comprise, or be stored in association with, metadata providing indexing or context indicating an origin of a leaf node data (e.g., where/how the value was determined).

In some embodiments, system 200 comprises formula evaluator module 239. Formula evaluator module 239 may be implemented by the formula evaluator described in connection with system 100 of FIG. 1. System 200 uses formula evaluator module 239 to evaluate a formula on a particular location in the data structure. In response to receiving a call from request evaluator module 237, formula evaluator module 239 may determine the type of formula to be evaluated and correspondingly implements the associated algorithm for evaluating the type of formula. As an example, formula evaluator module 239 may determine whether the formula to be evaluated is an open pattern formula, a closed pattern formula, or an almost-closed pattern formula.

In some embodiments, system 200 comprises query response module 241. System 200 uses query response module 241 to aggregate the data obtained for the set of requests to obtain a response to the query. The data may be aggregated in accordance with the definition of the normalized query obtained by the query engine.

In some embodiments, system 200 comprises user interface module 243. System 200 uses user interface module 243 in connection with configuring information (or the display thereof) to be provided to the user such as via client system 140 and/or administrator system 130 of system 100. In some embodiments, user interface module 243 configures a user interface to be displayed at a client system, such as an interface that is provided in a web browser at the client system. User interface module 243 may configure a user interface via which a query may be input. In some embodiments, user interface module 243 configures a user interface to provide a response to the query, such as by providing one or more reports of information that is responsive to a query or task executed with respect to the source dataset(s) (e.g., a query or task executed against data stored on data store 120).

According to various embodiments, storage 215 comprises one or more of file system data 260, data space 265, and/or leaf pool 270. Storage 215 comprises a shared storage (e.g., a network storage system). In some embodiments, file system data 260 comprises a database such as one or more datasets (e.g., one or more datasets for one or more tenants, etc.). File system data 260 comprises data such as a dataset for historical information pertaining to user activity, a human resources database, a financial database, etc. In some embodiments, data space 265 comprises a set of data structures respectively associated with a set of requests being executed in connection with the query. In some embodiments, leaf pool 270 comprises a set of leaf pools respectively associated with a set of requests being executed in connection with the query.

According to various embodiments, memory 220 comprises executing application data 275. Executing application data 275 comprises data obtained or used in connection with executing an application such as an application executing on a tenant. In some embodiments, the application comprises one or more applications that perform one or more of receiving and/or executing a query or task, generating a report and/or configure information that is responsive to an executed query or task, and/or providing to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

FIG. 3A is an example of describing an ad hoc multidimensional request in a query according to various embodiments of the present application. In the example shown, query 300 comprises a set of dimensional identifiers that describe the data for which the query is to be evaluated. The set of dimensional identifiers may include dimensional identifiers 302-306. As an example, dimensional identifier 302 may comprise a dimensional space descriptor. As another example, dimensional identifier 304 may comprise an attribute descriptor (e.g., a list of time elements for a time attribute/dimension). As yet another example, dimensional identifier 306 may comprise an indication of a currency in which the data is to be represented/converted into. The query can capture the entire dimensional space in a single request. The system uses the relationship between data points (e.g., elements in the data space) to determine the optimal execution path (e.g., how the query can be subdivided into a set of requests to be processed in parallel), and to compute the data query.

Figure 3B:
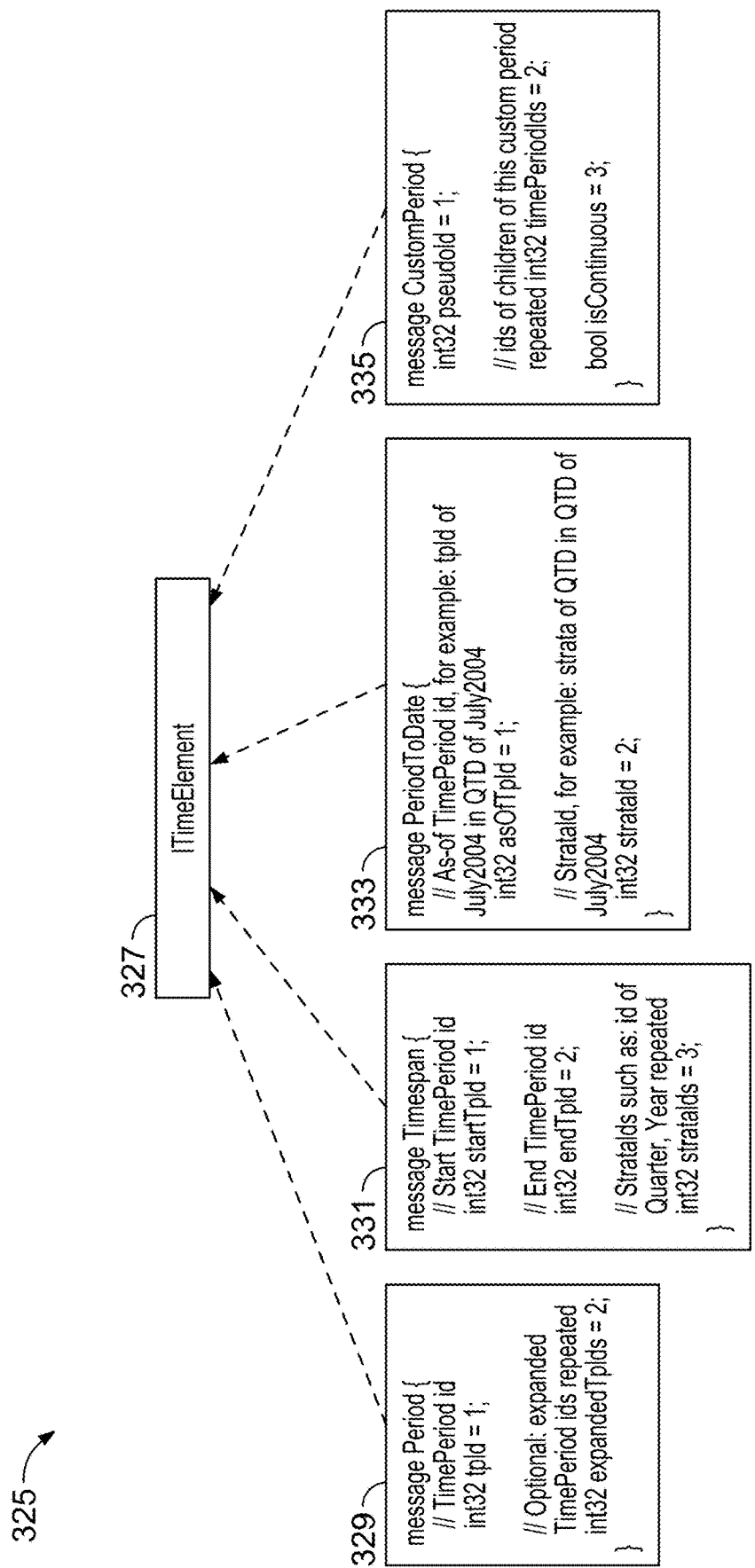
FIG. 3B illustrates examples of defining a dimension for the query according to various embodiments of the present application.

FIG. 3B illustrates examples of defining a dimension for the query according to various embodiments of the present application. The example shown illustrates various ways in which dimensional identifier 325 can be represented. As illustrated, dimensional identifier 325 comprises time element 327 that indicates the time elements for a time attribute or dimension over which a query is to be executed. A customer generally wants to run a report (e.g., query) that requests certain data for all levels intersected with regions over specific time. Time element 327 may be represented according to period descriptor 329, timespan descriptor 331, period-to-date descriptor 333, or custom period descriptor 335.

Period descriptor 329 may be configured to specify the time periods in which data is to be represented and specify how the time is rolled up. For example, period descriptor 329 may define a stratum or many strata for rolling up. Examples of the stratum or strata include a week, a half week, a month, a quarter, a year, etc. The system may store values for each predefined period and performs a lookup to determine the selected predefined period based on a value comprised in the period descriptor 329. Period descriptor 329 may further include an expansion identifier that defines how the selected stratum/strata is/are to be expanded. The system may store a mapping of values to corresponding expansions, and perform a lookup to determine the selected expansion based on the expansion identifier comprised in period descriptor 329. An example of a type of expansion is to show data in a particular day, month, week, etc. The expansion can define the granularity of what data is to be represented.

Timespan descriptor 331 may be configured to specify a range of data according to a start period and an end period, such as data from January 2000 to September 2005. The period defined in timespan descriptor 331 can be any user-defined period, provided that a start date and an end date are specified by the user in timespan descriptor 331. Optionally, timespan descriptor 331 includes an indicator that is configured to indicate the granularity of time within that time period. For example, the user may use the indicator to control the reporting of data within the time period according to days, weeks, months, quarters, etc.

Period-to-date descriptor 333 may be configured to specify a range of data according to a start period and the current data, such as data from January 2000 to the present date. The period defined in period-to-date descriptor 333 can be any user-defined period, provided that a start date is specified by the user in period-to-date descriptor 333. Optionally, period-to-date descriptor 333 includes an indicator that is configured to indicate the granularity of time within that time period. For example, the user may use the indicator to control the reporting of data within the time period according to days, weeks, months, quarters, etc.

Custom period descriptor 335 may be configured to specify a particular date, date range of data, or sets of dates/date ranges (e.g., a set of time dimension identifiers for which data is to be aggregated). The period defined in custom period descriptor 335 can be any user-defined period, provided that a start date is specified by the user in custom period descriptor 335. The end date may be a current date or a user-specified end date. Optionally, custom period descriptor 335 includes an indicator that is configured to indicate the granularity of time within that time period. For example, the user may use the indicator to control the reporting of data within the time period according to days, weeks, months, quarters, etc.

Figure 3C:
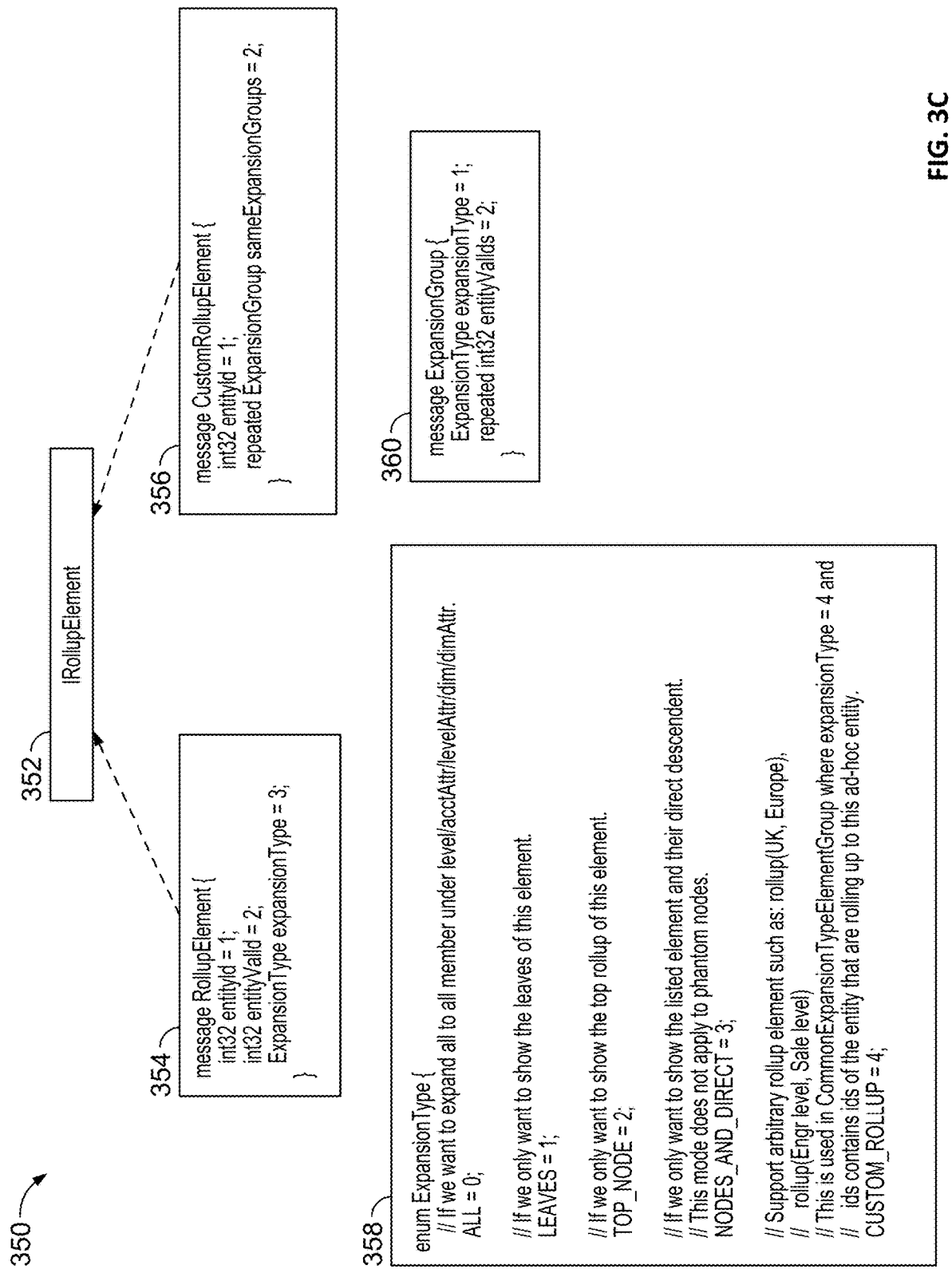
FIG. 3C illustrates examples of defining a dimension for the query according to various embodiments of the present application.

FIG. 3C illustrates examples of defining a dimension for the query according to various embodiments of the present application. The example shown illustrates various ways in which dimensional space descriptor 350 can be represented. As illustrated, dimensional space descriptor 350 comprises rollup descriptor 352 that indicates the data to be rolled up and aggregated in response to the query (e.g., indicates the dimensions along which data is to be aggregated). Dimensional space descriptor 350 may be represented according to rollup element 354 or custom rollup element 356. As shown, rollup element 354 or custom rollup element 356 may optionally include an indicator that indicates how the data under the applicable dimensions are to be expanded. For example, expansion type descriptor 358 is used to indicate what items to expand-all, leaves, a top node, a top node and its children, or a node and a predefined level of descendants. As another example, custom rollup element 356 is used to indicate under the same dimension, some groups of items will have one expansion type, and some will have different expansion type through expansion group descriptor 360—for example, under dimension Region, expand top and children nodes of US, Europe, and expand all under Asia.

Figure 4:
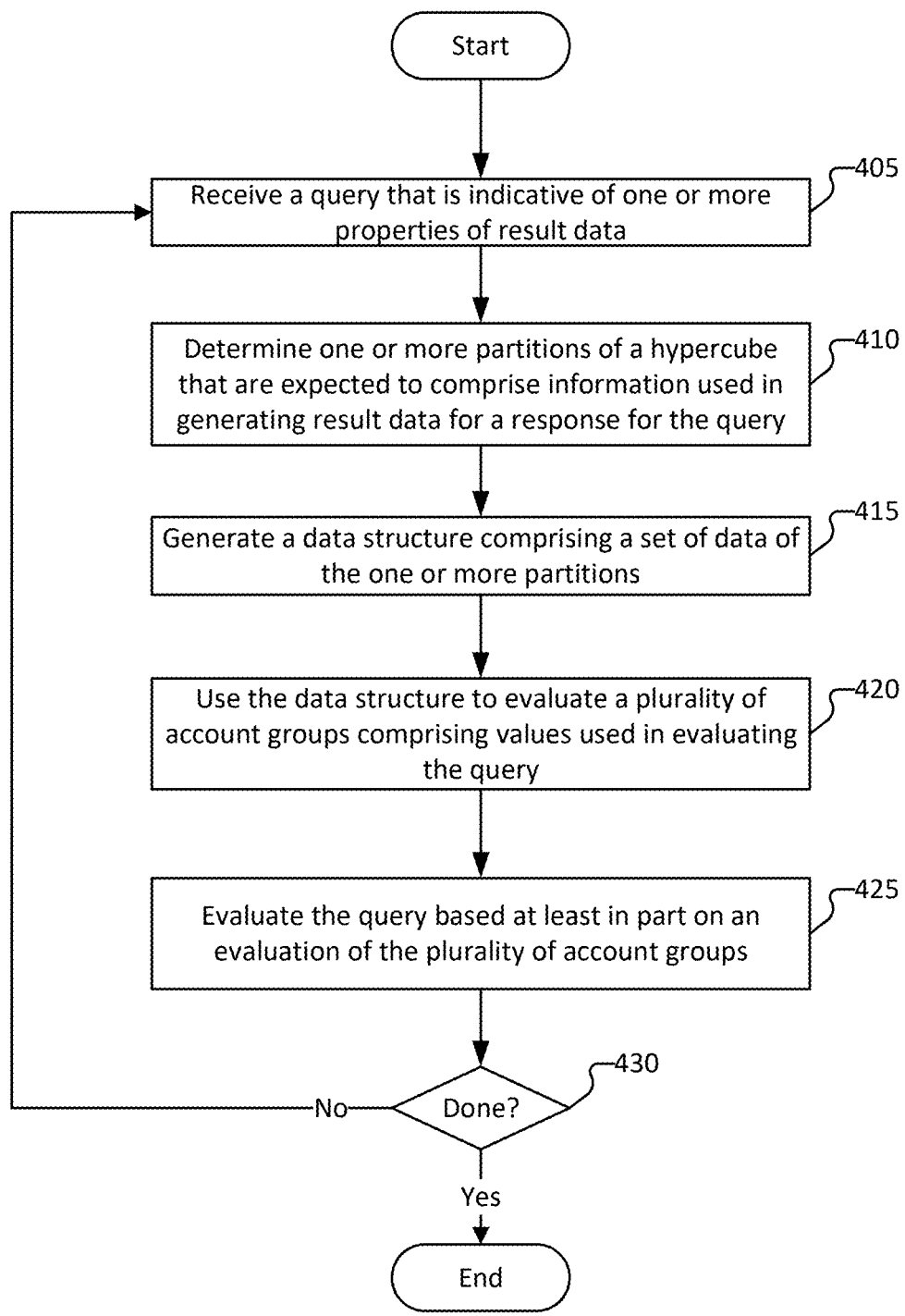
FIG. 4 is a flow diagram of a method for evaluating a query according to various embodiments of the present application.

FIG. 4 is a flow diagram of a method for evaluating a query according to various embodiments of the present application. In some embodiments, process 400 is implemented by system 100 of FIG. 1 and/or system 200 of FIG. 2.

At 405, the system receives a query. The query is indicative of one or more properties of result data. For example, the query includes one or more descriptors of intersections of the dataspace for data responsive to the query. Additionally, the query may optionally include one or more indicators of the manner in which data is to be expanded and aggregated, etc. At 410, the system determines one or more partitions of a hypercube that are expected to comprise information used in generating result data for a response for the query. As an example, the system determines non-overlapping data spaces to be used in connection with a set of requests (e.g., subqueries) that can be processed in parallel. At 415, the system generates a data structure comprising a set of data of the one or more partitions. In response to determining the one or more partitions and the corresponding set of requests, the system builds a set of data structures each associated with a particular partition or request. The set of data structures comprises information indicating locations from which corresponding cells are retrieved (or to be retrieved) and relationships between data in the data structure. At 420, the system uses the data structure to evaluate a plurality of account groups comprising values used in evaluating the query. At 425, the system evaluates the query based at least in part on an evaluation of the plurality of account groups. For example, the system aggregates the data responsive to the set of requests into a response to the query. At 430, a determination is made as to whether process 400 is complete. In some embodiments, process 400 is determined to be complete in response to a determination that no further queries are to be processed, the response to the query has been successfully communicated, the user has exited the system, an administrator indicates that process 400 is to be paused or stopped, etc. In response to a determination that process 400 is complete, process 400 ends. In response to a determination that process 400 is not complete, process 400 returns to 405.

Figure 5:
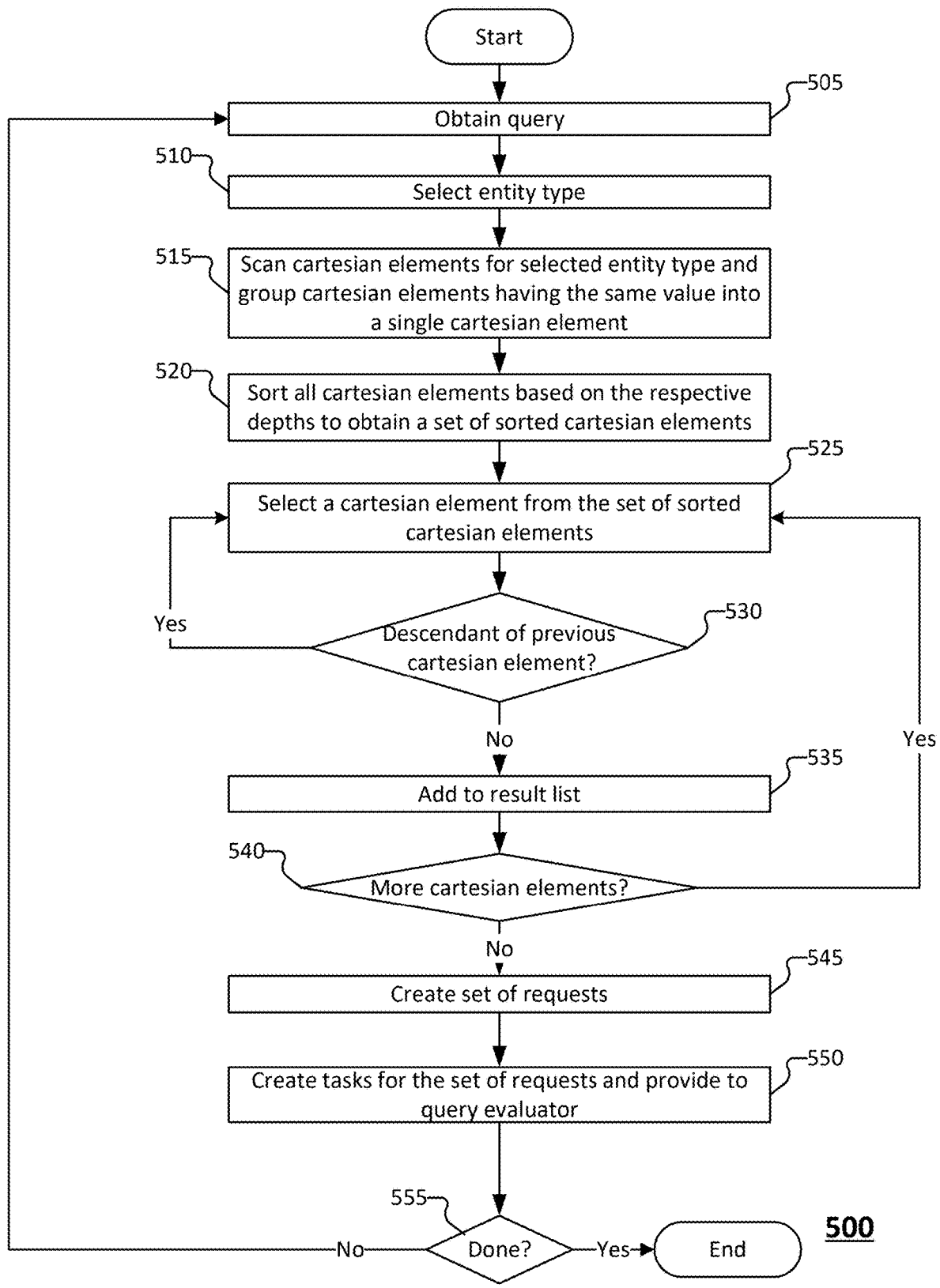
FIG. 5 is a flow diagram of a method for processing a query to identify relevant portions of a hypercube according to various embodiments of the present application.

FIG. 5 is a flow diagram of a method for processing a query to identify relevant portions of a hypercube according to various embodiments of the present application. In some embodiments, process 500 is implemented by system 100 of FIG. 1 and/or system 200 of FIG. 2. Process 500 may be invoked in connection with process 400, such as at 410 of process 400.

Process 500 describes the method for optimizing computation time of a query. For example, the system implements process 500 to minimize the computational work by identifying independent data spaces or requests that can be processed in parallel without redundant computation. For example, the system determines result data without redundant computation of intermediate results with respect to which a set of subsequent computations have a dependency.

The purpose of preprocessing the request is to normalize the query to include only distinct, non-overlapping dimensional spaces as much as possible. The system (e.g., the query engine) scans through each element in the request to group the elements by dimension and, for each dimension, the system scans through all the values to normalize the values to make sure items that elements having an ancestor-descendant relationship with respect to each other belong to the same group.

At 505, the system obtains a query.

At 510, the system selects an entity type.

At 515, the system scans Cartesian elements for the selected entity type and groups Cartesian elements having the same value into a single Cartesian element.

At 520, the system sorts all the Cartesian elements based on their respective depths to obtain a set of sorted Cartesian elements.

At 525, a Cartesian element from the set of sorted Cartesian elements is selected.

At 530, the system determines whether the selected Cartesian element is a descendent of the previous Cartesian elements. In response to determining that the selected Cartesian element is a descendent of the previous Cartesian elements, process 500 returns to 525 and another Cartesian element is selected. Process 500 iterates over 525-530 until the selected Cartesian is determined to be a descendant of the previous Cartesian element. In response to determining that the selected Cartesian element is not a descendant of the previous Cartesian element, process 500 proceeds to 535 at which the selected Cartesian element is added to a result list.

At 540, the system determines whether more Cartesian elements are to be evaluated. For example, the system determines whether another Cartesian element from the set of sorted Cartesian elements is to be assessed as to whether it is a descendant of a previous Cartesian or is to be added to the Cartesian element. The system iterates over 525-540 in connection with identifying independent partitions or Cartesian elements for which independent requests can be created and used to parallelize evaluation of independent portions of result data for the query. In response to determining that another Cartesian element is to be evaluated, process 500 returns to 525. Conversely, in response to determining that no further Cartesian elements are to be evaluated, process 500 proceeds to 545. At 545, the system creates a set of requests. The system creates the set of requests based on a set of Cartesian elements comprised in the result list. For example, for each Cartesian element in the result list the system creates a corresponding request. Each request is a sub request of a query (e.g., the original matrix request). In some embodiments, the system ensures that all requests are a non-overlapping, independent group of data that can be executed in parallel.

At 550, the system creates tasks for the set of requests and provides the tasks to the query evaluator. The system causes at least a subset of the tasks (e.g., tasks for different requests) to be evaluated in parallel. In some embodiments, the system invokes process 600 in connection with processing the tasks to evaluate the set of requests. The system feeds the set of tasks into a parallel framework to execute the corresponding request. In some embodiments, the system performs at least a subset of requests in parallel.

At 555, a determination is made as to whether process 500 is complete. In some embodiments, process 500 is determined to be complete in response to a determination that no further queries are to be processed, no further requests are to be created, the response to the query has been successfully communicated, the user has exited the system, an administrator indicates that process 500 is to be paused or stopped, etc. In response to a determination that process 500 is complete, process 500 ends. In response to a determination that process 500 is not complete, process 500 returns to 505.

Figure 6:
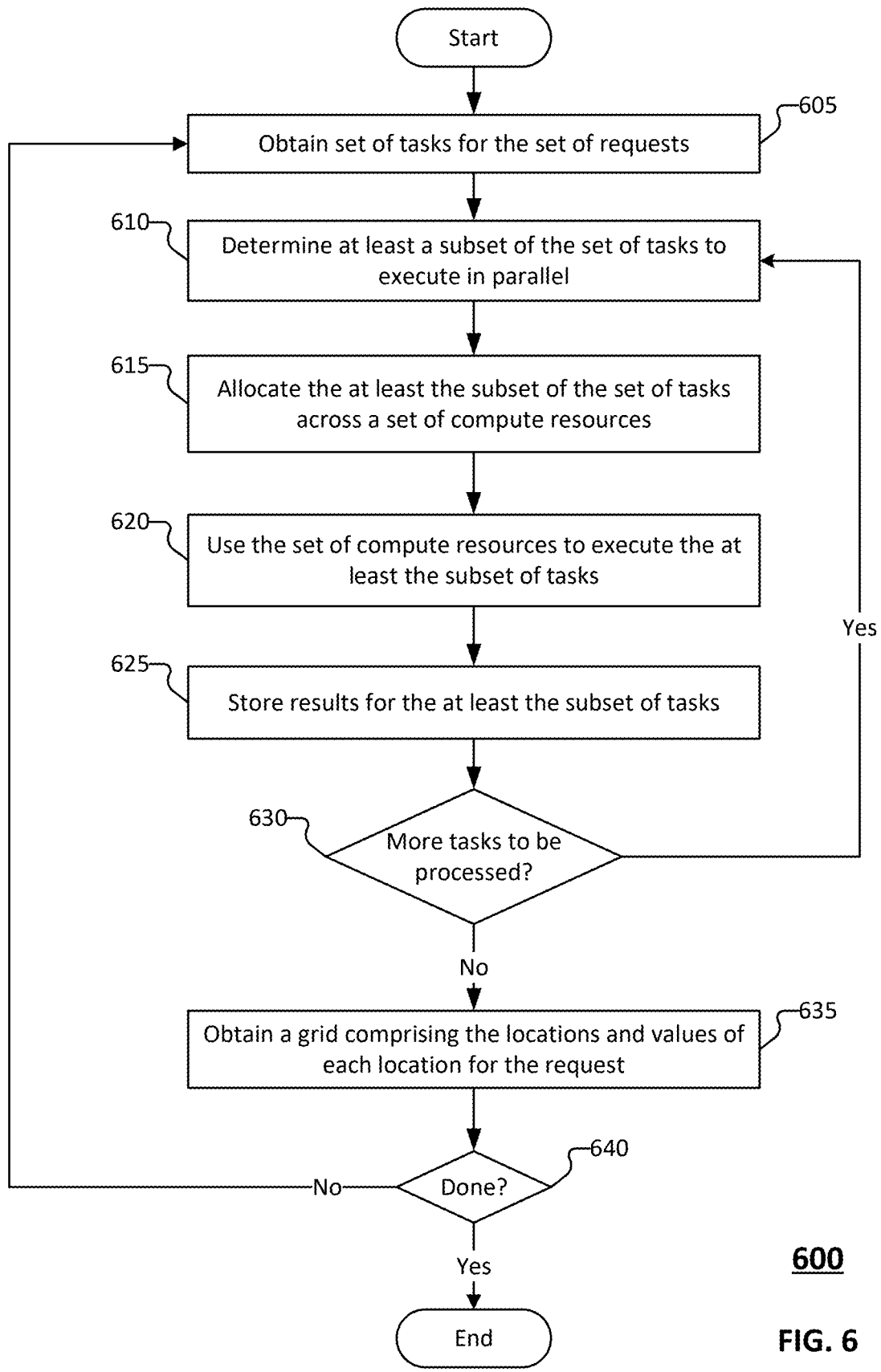
FIG. 6 is a flow diagram of a method for generating a data structure according to various embodiments of the present application.

FIG. 6 is a flow diagram of a method for generating a data structure according to various embodiments of the present application. In some embodiments, process 600 is implemented by system 100 of FIG. 1 and/or system 200 of FIG. 2. Process 600 may be invoked by process 400, such as at 415 and/or 420. In some embodiments, process 600 is implemented by the execution engine described in connection with system 100 of FIG. 1.

At 605, a set of tasks is obtained for the set of requests. At 610, the system determines a least a subset of the set of tasks to execute in parallel. For example, the system ensures that the subset of tasks to be executed in parallel does not have any cross dependencies (e.g., one request does not depend on results from another request), etc. At 615, the system allocates the at least the subset of the set of tasks across a set of compute resources. At 620, the system uses the set of compute resources to execute the at least the subset of tasks. At 625, the system stores the results for the at least the subset of tasks. At 630, the system determines whether additional tasks are to be processed. In response to determining that additional tasks are to be processed, the system returns to 610 and iterates over 615-630 until no further tasks are to be processed. Conversely, in response to determining that no further tasks are to be processed, the system proceeds to 635. At 635, the system obtains a grid comprising the locations and values of each location for the request. The grid may be a data structure or other data space that the system creates in connection with evaluating a query. In some embodiments, the system stores the results in a leaf pool in connection with performing a rollup of evaluations to determine a response to the query. At 640, a determination is made as to whether process 600 is complete. In some embodiments, process 600 is determined to be complete in response to a determination that no further queries are to be processed, no further tasks are to be performed, no further requests are to be evaluated, the response to the query has been successfully communicated, the user has exited the system, an administrator indicates that process 600 is to be paused or stopped, etc. In response to a determination that process 600 is complete, process 600 ends. In response to a determination that process 600 is not complete, process 600 returns to 605.

Figure 7:
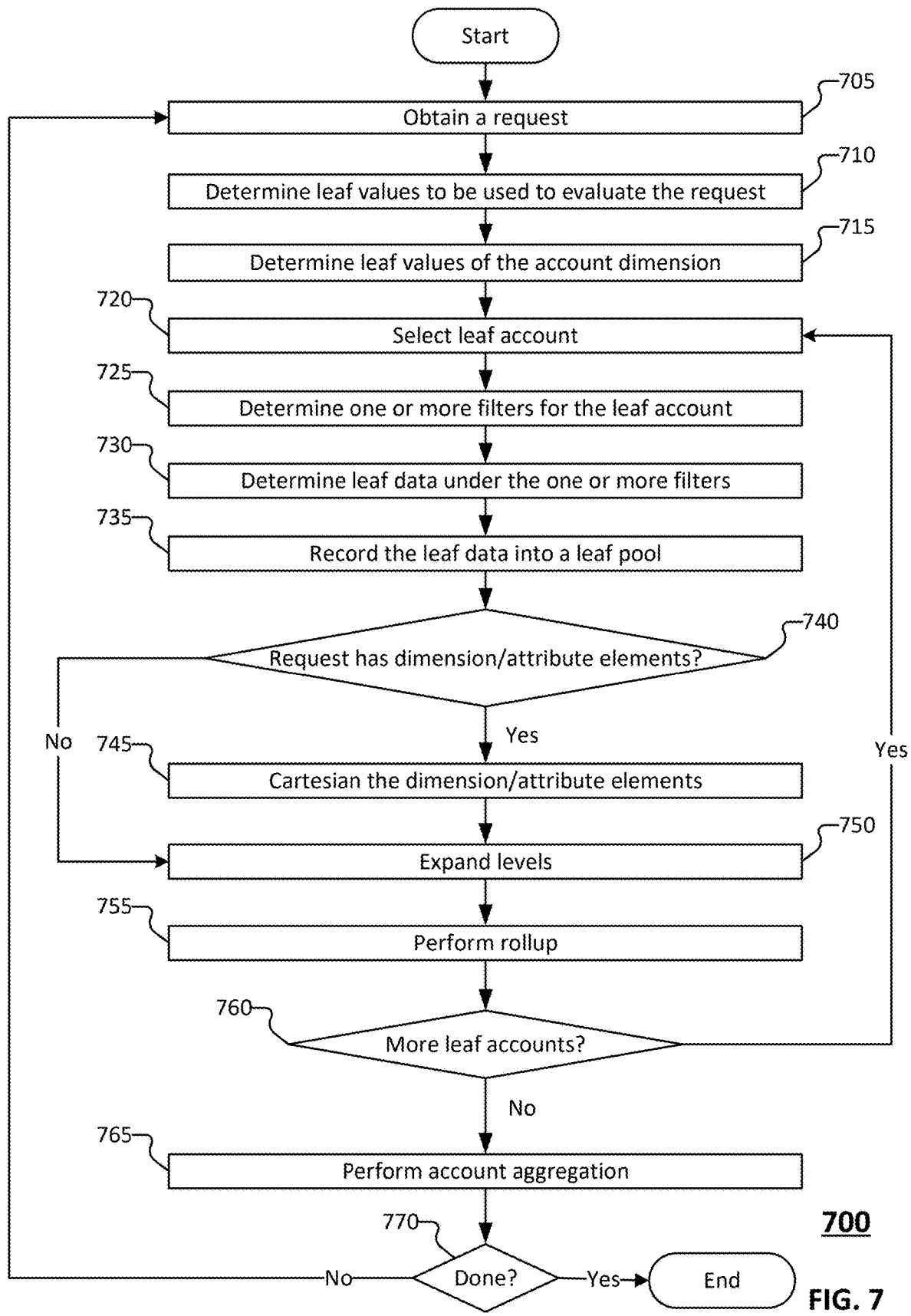
FIG. 7 is a flow diagram of a method for using the data structure for evaluation of a query according to various embodiments of the present application.

FIG. 7 is a flow diagram of a method for using the data structure for evaluation of a query according to various embodiments of the present application. In some embodiments, process 700 is implemented by system 100 of FIG. 1 and/or system 200 of FIG. 2. Process 700 may be invoked by process 400, such as at 415 and/or 420. In some embodiments, process 700 is implemented by the execution engine described in connection with system 100 of FIG. 1.

At 705, a request is obtained. At 710, leaf values to be used to evaluate the request are determined. For example, the system identifies those leaf values that are invoked (e.g., to be used) in evaluating the request. The system may generate a data structure based on the identified leaf values, which may maintain or otherwise include a description of the relationships between data in the corresponding data space. At 715, leaf values for the account dimension are determined. At 720, a leaf account is selected. At 725, one or more filters for the leaf account are determined. At 730, leaf data under the one or more filters is determined. At 735, the leaf data is recorded into a leaf pool. At 740, the system determines whether the request has dimension or attribute elements. In response to determining that the request has dimension or attribute elements, process 700 proceeds to 745. Conversely, in response to determining that the request does not comprise dimension or attribute elements, process 700 proceeds to 750. At 745, the system Cartesians the dimension or attribute elements. At 750, levels are expanded. The system determines all levels that are needed to process the request. Further, the system may expand the levels to identify/obtain the values for descendants or lower levels. At 755, a rollup is performed. At 760, the system determines whether additional leaf accounts are to be evaluated. In response to determining that additional leaf accounts are to be evaluated, process 700 returns to 720 and process 700 iterates over 720-760 until no further leaf accounts are to be evaluated. Conversely, in response to determining that no further leaf accounts are to be evaluated, process 700 proceeds to 765. At 765, account aggregation is performed. The account aggregation is performed in connection with the query (or subquery) definition. At 770, a determination is made as to whether process 700 is complete. In some embodiments, process 700 is determined to be complete in response to a determination that no further queries are to be processed, no further request is to be evaluated, the response to the query has been successfully communicated, the user has exited the system, an administrator indicates that process 700 is to be paused or stopped, etc. In response to a determination that process 700 is complete, process 700 ends. In response to a determination that process 700 is not complete, process 700 returns to 705.

Figure 8:
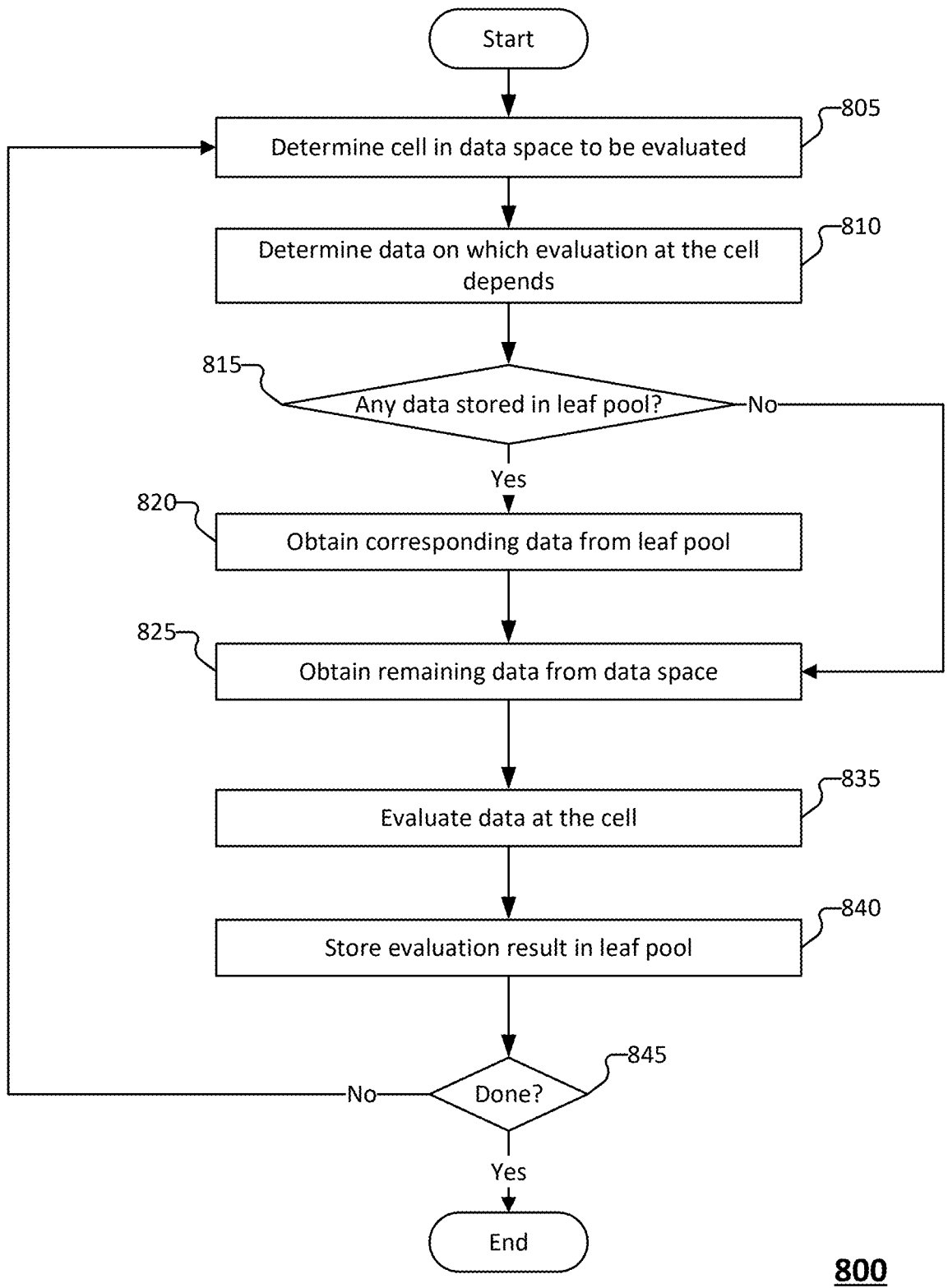
FIG. 8 is a flow diagram for generating roll-up values during evaluation of a query according to various embodiments of the present application.

FIG. 8 is a flow diagram for generating roll-up values during evaluation of a query according to various embodiments of the present application. In some embodiments, process 800 is implemented by system 100 of FIG. 1 and/or system 200 of FIG. 2. Process 800 may be invoked by process 400 such as at 420, or by process 600, such as at 620. In some embodiments, process 800 is implemented by the execution engine described in connection with system 100 of FIG. 1.

At 805, the system determines a cell in the data space to be evaluated. The system determines a cell to be evaluated based on the corresponding task or request from the set of requests into which the query is divided. At 810, the system determines data on which evaluation of the cell depends. The system traverses the data structure to identify relationships between the data and identifies data to be evaluated before evaluation of the cell data. At 815, the system determines whether any data of the cell is stored in the leaf pool. For example, the system determines whether any dependent data has been previously computed. In response to determining that applicable data is stored in the leaf pool at 815, process 800 proceeds to 820 and the system obtains the corresponding data from the leaf pool. Conversely, in response to determining that the applicable data is not stored in the leaf pool at 815, process 800 proceeds to 825. Process 825 obtains any remaining data (e.g., data not in the leaf pool) for evaluation at the cell. Obtaining remaining data may include computing data on a descendant cell and storing the computed data in the leaf pool for subsequent use. At 835, the data at the cell is evaluated. In some embodiments, process 800 invokes the formula evaluator described in connection with system 100 of FIG. 1 to evaluate the data in accordance with the applicable formula definition (e.g., the arithmetic expression). At 840, the system stores the evaluation result in the leaf pool. At 845, a determination is made as to whether process 800 is complete. In some embodiments, process 800 is determined to be complete in response to a determination that no further queries are to be processed, the response to the query has been successfully communicated, the user has exited the system, an administrator indicates that process 800 is to be paused or stopped, etc. In response to a determination that process 800 is complete, process 800 ends. In response to a determination that process 800 is not complete, process 800 returns to 805.

FIG. 9A is an example of a data space according to various embodiments of the present application. FIG. 9B is an example of a key combination for a particular point in a data space according to various embodiments.

In some embodiments, the system uses data space 900 in connection with generating a corresponding key space 950. As illustrated, data space 900 includes three dimensions (e.g., three columns): column 0, column 1, and column 2. The total number of keys in key space 950 is defined by multiplying the size of the dimensions. For example, the number of keys is equal to the product of S0 (e.g., the size of column 0), S1 (e.g., the size of column 1), and S2 (e.g., the size of column 2). The particular key combination for a key in key space 950 is defined in the cells of the row of key space 950 illustrated in FIG. 9B.

Figure 10A:
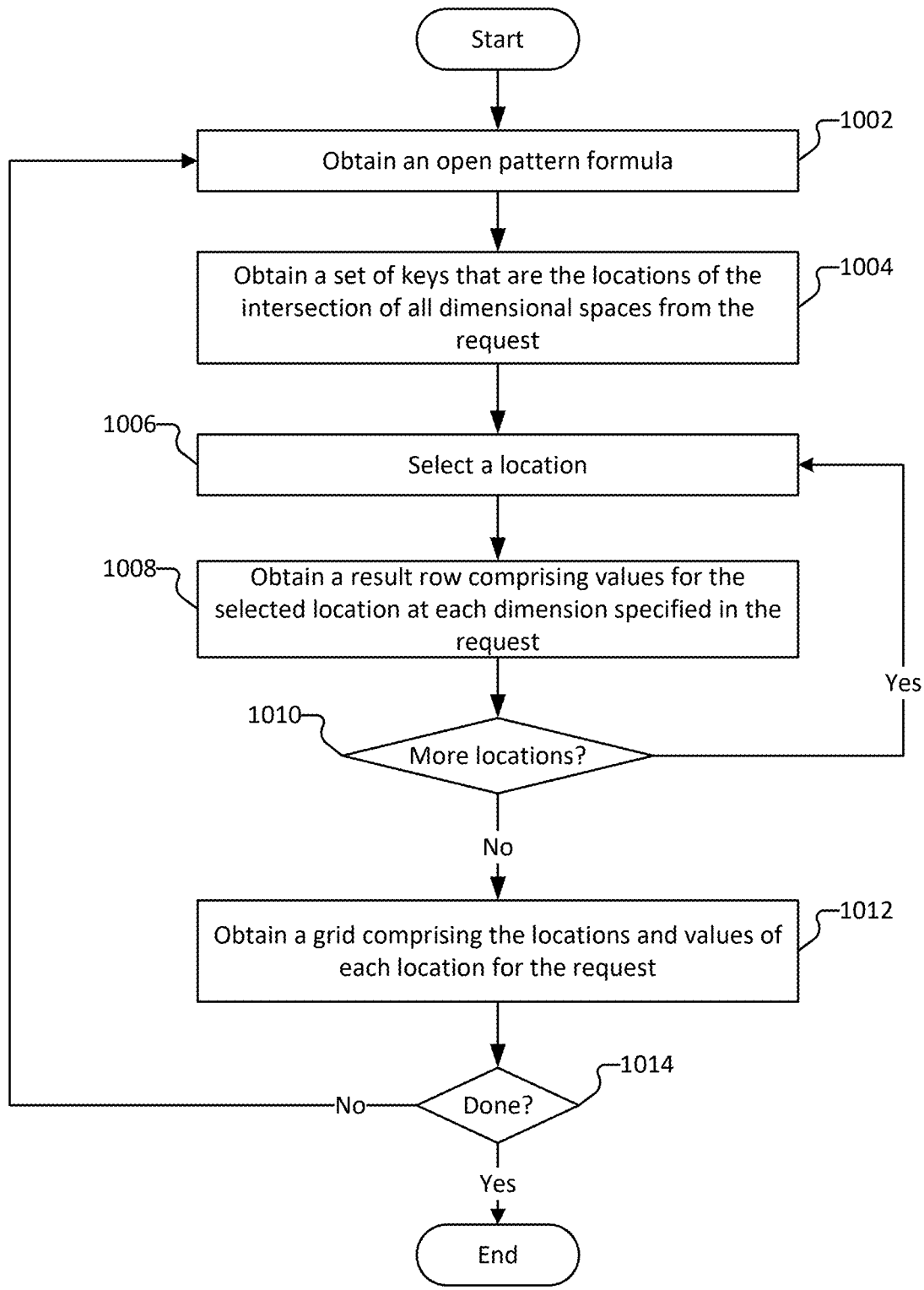
FIG. 10A is a flow diagram of a method for evaluating an open pattern formula according to various embodiments of the present application.

FIG. 10A is a flow diagram of a method for evaluating an open pattern formula according to various embodiments of the present application. In some embodiments, process 1000 is implemented by system 100 of FIG. 1 and/or system 200 of FIG. 2. In some embodiments, process 1000 is invoked in connection with process 400 and/or process 800. As an example, process 1000 may be invoked at 835 of process 800. Process 1000 may be invoked in connection with evaluating an open pattern formula.

At 1002, the system obtains an open pattern formula. At 1004, the system obtains a set of keys that are the locations of the intersection of all dimensional spaces from the request. The set of keys may be obtained from the key space, such as key space 950. At 1006, the system selects a location. For example, the system selects a location corresponding to a key in the set of keys. At 1008, the system obtains a result row comprising values for the selected location at each dimension specified in the request. At 1010, the system determines whether values for another location are to be obtained. The system determines whether values corresponding to locations for another key in the set of keys are to be obtained. In response to determining that values for another location are to be obtained, process 1000 returns to 1006 and process 1000 iterates over 1006 to 1010 until no further values for other locations are to be obtained. In response to determining that no further values are to be obtained for other locations, process 1000 proceeds to 1012. At 1012, the system obtains a grid comprising the locations and values of each location for the request. At 1014, a determination is made as to whether process 1000 is complete. In some embodiments, process 1000 is determined to be complete in response to a determination that no further queries are to be processed, no further open pattern formulas are to be evaluated, the response to the query has been successfully communicated, the user has exited the system, an administrator indicates that process 1000 is to be paused or stopped, etc. In response to a determination that process 1000 is complete, process 1000 ends. In response to a determination that process 1000 is not complete, process 1000 returns to 1002.

Figure 10B:
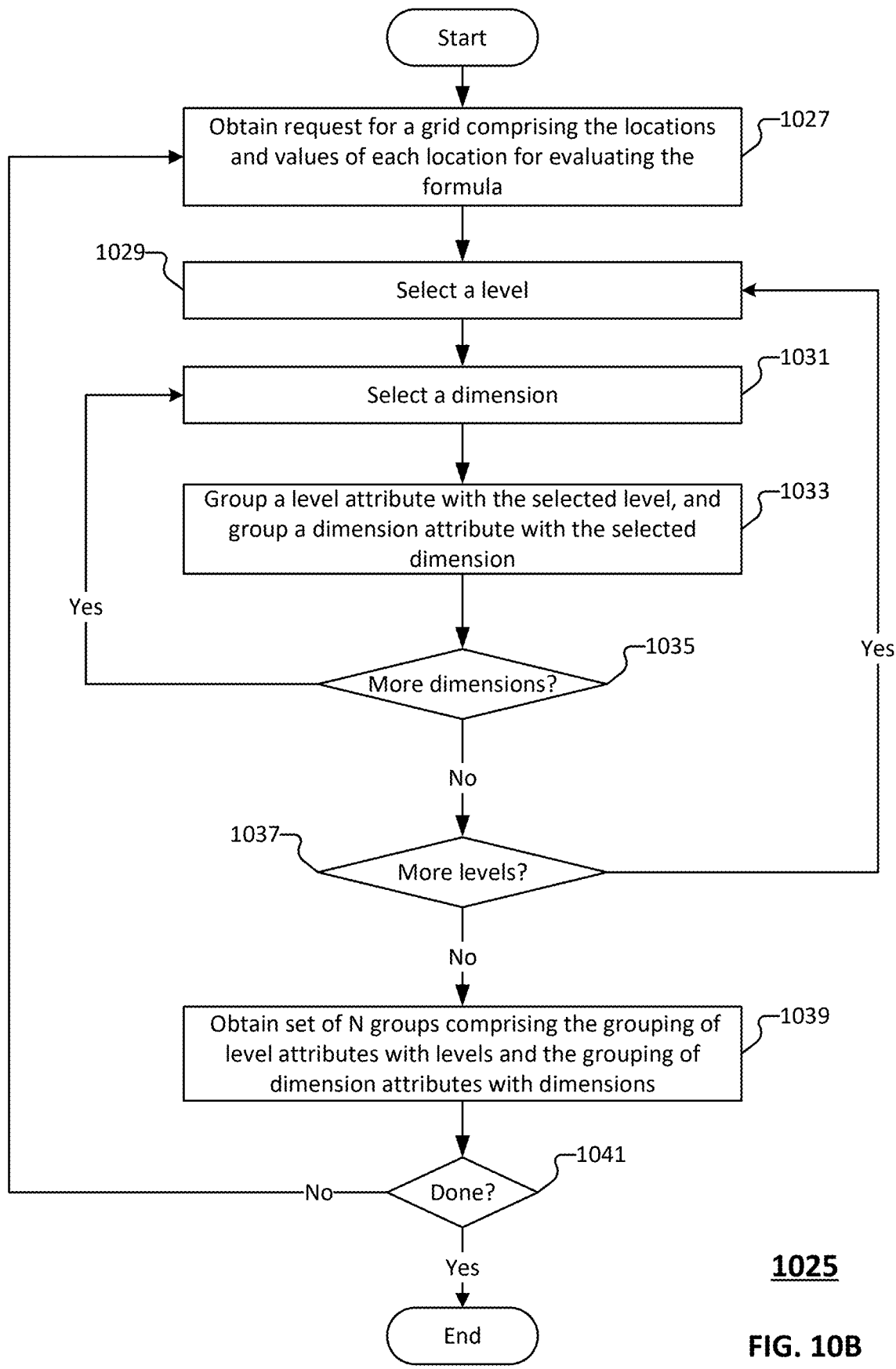
FIG. 10B is a flow diagram of a method for identifying various points in the grid according to various embodiments.

FIG. 10B is a flow diagram of a method for identifying various points in the grid according to various embodiments. In some embodiments, process 1025 is implemented by system 100 of FIG. 1 and/or system 200 of FIG. 2. In some embodiments, process 1025 is invoked in connection with process 400 and/or process 800. As an example, process

1025 may be invoked at 835 of process 800. Process 1025 may be invoked in connection with evaluating an open pattern formula. For example, process 1025 is invoked by 1012 of process 1000 in connection with determining the groups for which the key space is to be defined.

At 1027, the system obtains a request for a grid comprising the locations and values of each location for evaluating the formula. At 1029, the system selects a level. At 1031, the system selects a dimension. At 1033, the system groups a level attribute with the selected level and groups the dimension attribute with the selected dimension. At 1035, the system determines whether a grouping of dimension attributes with dimensions is to be performed with respect to additional dimensions. In response to determining that the grouping is to be performed with additional dimensions, process 1025 returns to 1031 and process 1025 iterates over 1031-1035 until no further groupings of dimension attributes is to be performed. In response to determining that no further groupings of dimension attributes with dimensions are to be performed, process 1025 proceeds to 1037. At 1037, the system determines whether a grouping of level attributes with levels is to be performed with respect to additional levels. In response to determining that the grouping is to be performed with additional levels, process 1025 returns to 1029 and process 1025 iterates over 1029-1037 until no further groupings of level attributes are to be performed. In response to determining that no further groupings of level attributes with levels are to be performed, process 1025 proceeds to 1039. At 1039, the system obtains a set of N groups comprising the grouping of level attributes with levels and the grouping of dimension attributes with dimensions. At 1041, a determination is made as to whether process 1025 is complete. In some embodiments, process 1025 is determined to be complete in response to a determination that no further queries are to be processed, no further open pattern formulas are to be evaluated, the response to the query has been successfully communicated, the user has exited the system, an administrator indicates that process 1025 is to be paused or stopped, etc. In response to a determination that process 1025 is complete, process 1025 ends. In response to a determination that process 1025 is not complete, process 1025 returns to 1027.

Figure 10C:
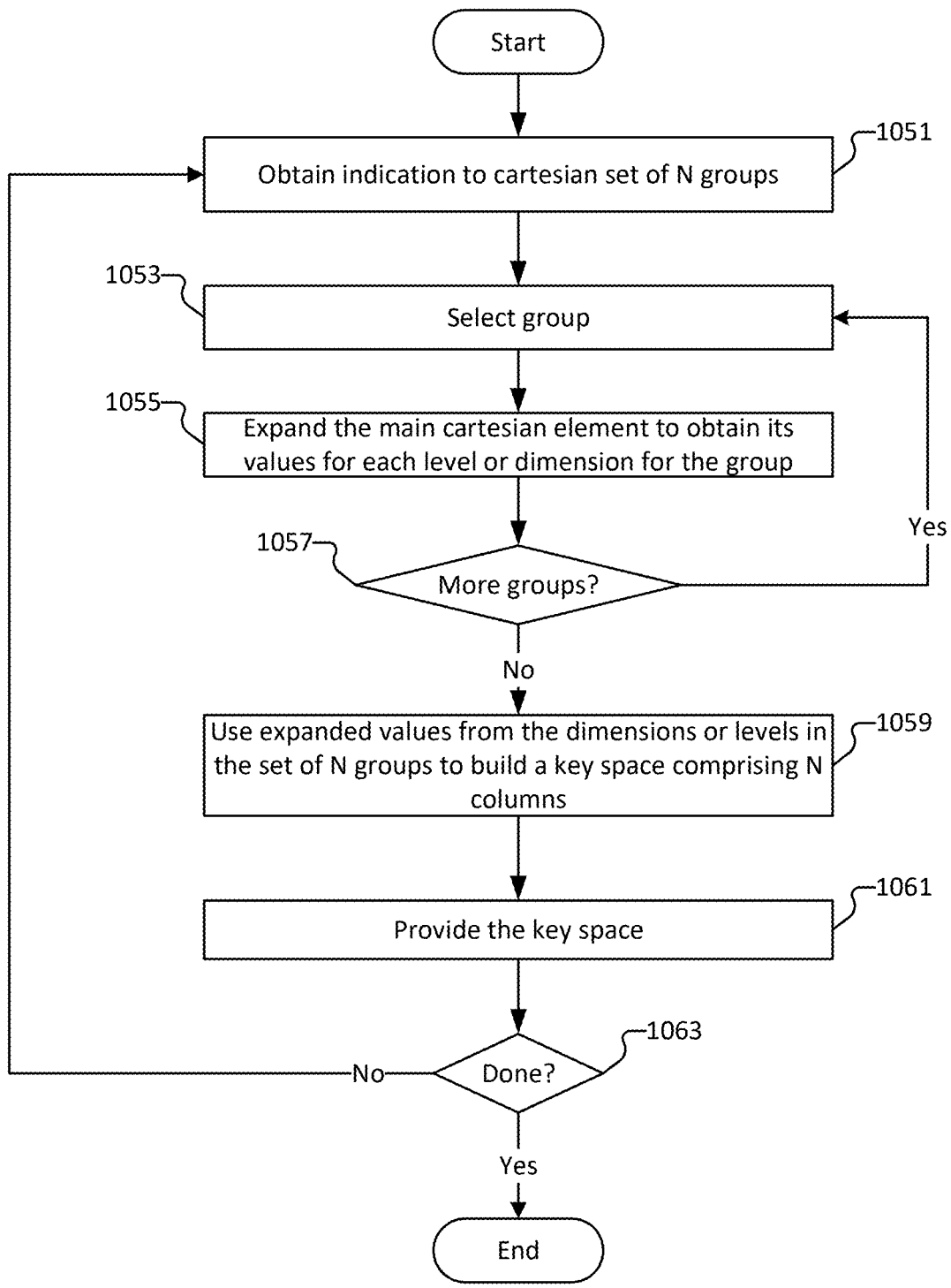
FIG. 10C is a flow diagram of a method for obtaining a key space for the various points in the grid according to various embodiments.

FIG. 10C is a flow diagram of a method for obtaining a key space for the various points in the grid according to various embodiments. In some embodiments, process 1050 is implemented by system 100 of FIG. 1 and/or system 200 of FIG. 2. In some embodiments, process 1050 is invoked in connection with process 400 and/or process 800. As an example, process 1050 may be invoked at 835 of process 800. Process 1050 may be invoked in connection with evaluating an open pattern formula. For example, process 1050 is invoked by 1012 of process 1000 in connection with determining the key space, such as based on the N groups determined by process 1025.

At 1051, the system obtains an indication to Cartesian a set of N groups. N is a positive integer. At 1053, the system selects a group from the set of N groups. At 1055, the system expands the main Cartesian element to obtain its values for each level or dimension for the group. At 1057, the system determines whether values are to be obtained for other levels or dimensions. In response to determining that values are to be obtained for the levels or dimensions, process 1050 returns to 1053 and process 1050 iterates over 1053-1057 until no further values are to be obtained for groups. Conversely, in response to determining that no further values are to be obtained for the levels or dimensions, process 1050 proceeds to 1059. At 1059, the system uses the expanded values from the dimensions or levels in the set of N groups to build a key space comprising N columns. At 1061, the system provides the key space. At 1063, a determination is made as to whether process 1050 is complete. In some embodiments, process 1050 is determined to be complete in response to a determination that no further queries are to be processed, no further open pattern formulas are to be evaluated, the response to the query has been successfully communicated, the user has exited the system, an administrator indicates that process 1050 is to be paused or stopped, etc. In response to a determination that process 1050 is complete, process 1050 ends. In response to a determination that process 1050 is not complete, process 1050 returns to 1051.

Figure 11:
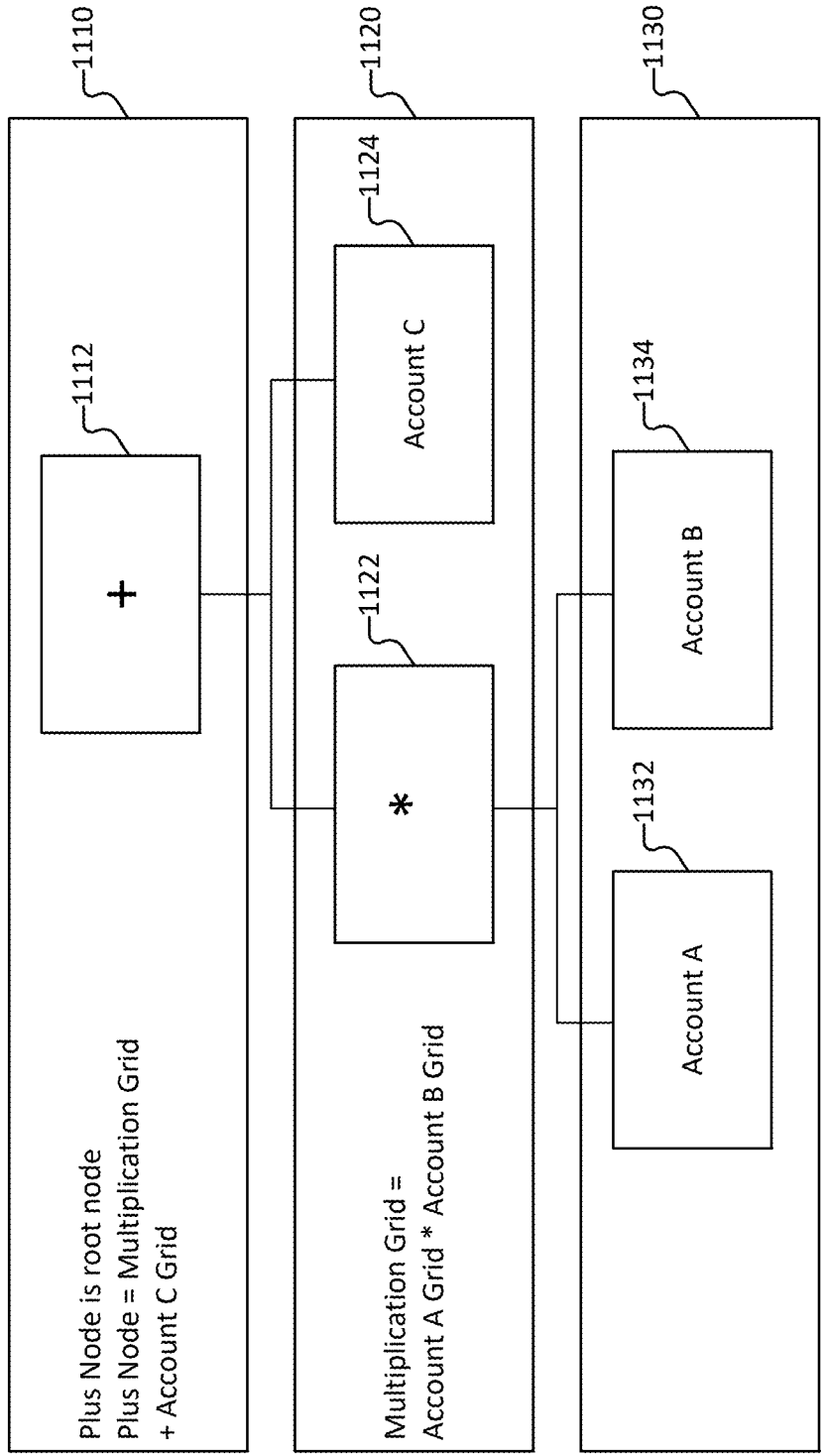
FIG. 11 is an example of a closed pattern formula according to various embodiments of the present application.

FIG. 11 is an example of a closed pattern formula according to various embodiments of the present application. In the example shown, a closed pattern formula is deconstructed into formula tree 1100 that identifies the account dependencies for resolving the formula at a particular location in the data structure. The closed pattern formula used in this example is: Fx=Account A*Account B+Account C.

As illustrated in FIG. 11, the system determines root node 1110 for the closed pattern formula to be addition operation 1112. Root node 1110 is dependent on formula tree level 1120 comprising multiplication operation 1122 (with respect to dependent accounts Account A and Account B) and Account C 1124. Multiplication operation 1122 is dependent on the formula tree level 1130, which comprises the two accounts on which the multiplication operation is to be evaluated. For example, multiplication operation 1122 is dependent on Account A 1132 and Account B 1134.

In some embodiments, at each location and level of formula tree 1100, the system generates a grid request for the particular account(s). For example, the system generates a grid request for Account A and a grid request for Account B. Next, the system generates a grid request for Account C and a grid request for the product of the grids defined for Account A and Account B. Next, the system generates a grid request for the addition of the grid for multiplication operation 1122 and the grid for Account C.

Figure 12:
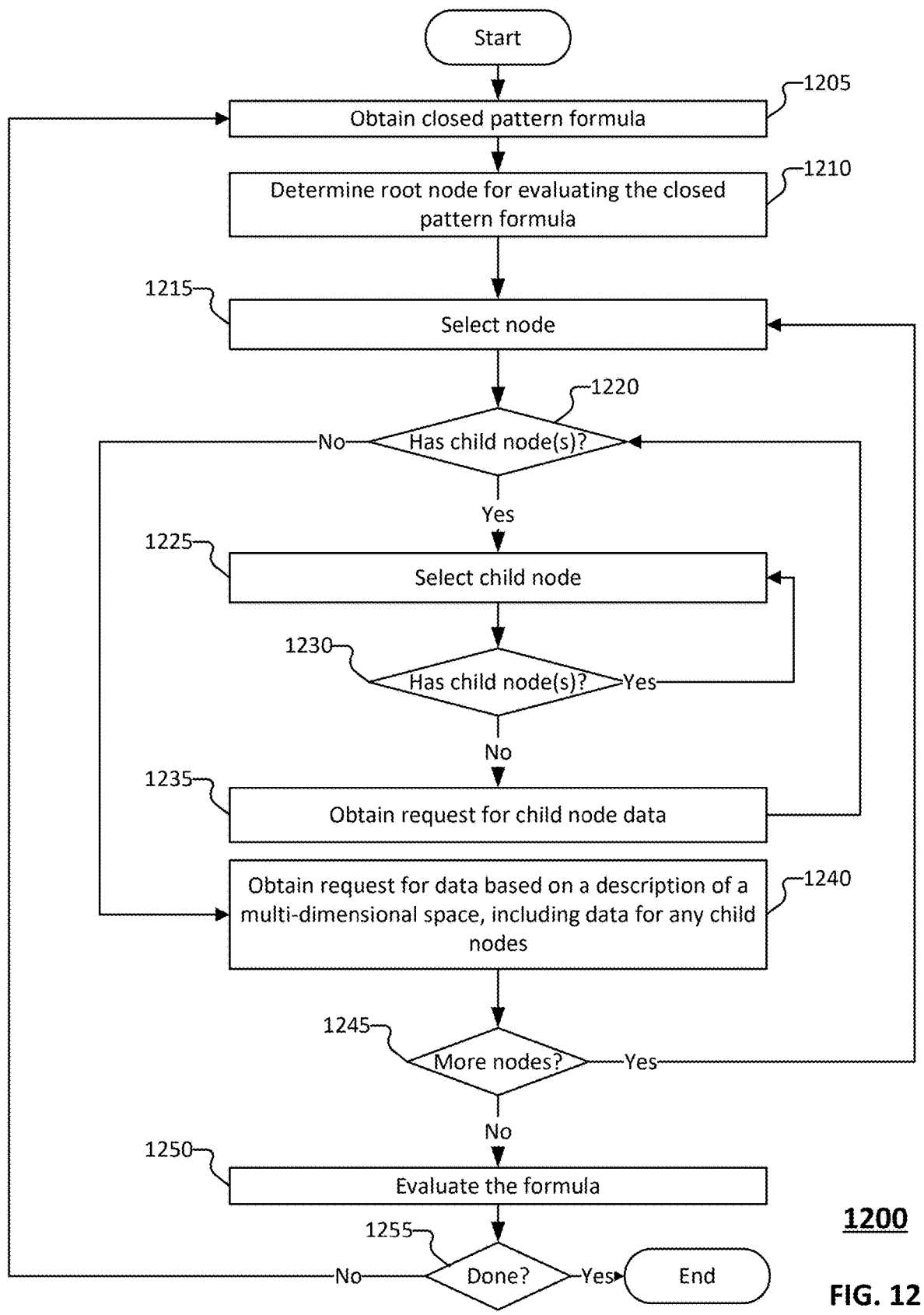
FIG. 12 is a flow diagram of a method for evaluating a closed pattern formula according to various embodiments of the present application.

FIG. 12 is a flow diagram of a method for evaluating a closed pattern formula according to various embodiments of the present application. In some embodiments, process 1200 is implemented by system 100 of FIG. 1 and/or system 200 of FIG. 2. In some embodiments, process 1200 is invoked in connection with process 400 and/or process 800. As an example, process 1200 may be invoked at 835 of process 800. Process 1200 may be invoked in connection with evaluating a closed pattern formula.

At 1205, the system obtains a closed pattern formula. At 1210, the system determines a root note for evaluating the closed pattern formula. At 1215, the system selects a node. At 1220, the system determines whether the selected node has a child node(s). In response to determining that the selected node has a child node, process 1200 proceeds to 1225. Conversely, in response to determining that the selected node does not have a child node, process 1200 proceeds to 1240. At 1225, the system selects a child node. For example, the system selects the child node in order to evaluate the values at the child node for a rollup into the parent/ancestor node(s). At 1230, the system determines whether the child node has a child node(s). In response to determining that the child node has a child node, process 1200 returns to 1225. Conversely, in response to determining that the child node does not have a child node, process 1200 proceeds to 1235. At 1235, the system obtains a request for child node data. At 1240, the system obtains a request for data for the selected node based on a description of a multi-dimensional space, including data for any child nodes. At 1245, the system determines whether more nodes are to be evaluated in connection with evaluating the formula. In response to determining to evaluate another node(s), process 1200 returns to 1215 and process 1200 iterates over 1215-1245 until no further nodes are to be evaluated. Conversely, in response to determining that no further nodes are to be evaluated, process 1200 proceeds to 1250. At 1250, the system evaluates the formula. At 1255, a determination is made as to whether process 1200 is complete. In some embodiments, process 1200 is determined to be complete in response to a determination that no further queries are to be processed, the response to the query has been successfully communicated, the user has exited the system, an administrator indicates that process 1200 is to be paused or stopped, etc. In response to a determination that process 1200 is complete, process 1200 ends. In response to a determination that process 1200 is not complete, process 1200 returns to 1205.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive a query that is indicative of one or more properties of result data;
determine, based at least in part on the query, one or more partitions of a hypercube, wherein:
the partitions are non-overlapping dimensional subspaces of the hypercube; and
each dimensional subspace is defined by a unique combination of coordinate values for a subset of the dimensions of the hypercube that are expected, based on the query semantics, to comprise information used in generating the result data for a response for the query;
deconstruct the query into a set of requests, wherein the set of requests comprises requested computations, each request is mapped to a respective one of the dimensional subspaces and is logically independent from the other requests in the set of requests;
generate, for each dimensional subspace, a data structure comprising a set of data for that dimensional subspace, wherein the data structure is indicative of relationships among data in the set of data;
use the data structure to evaluate the set of requests based at least in part on a plurality of account groups comprising values used in evaluating the query, wherein evaluating the set of requests comprises:
for evaluation of at least a subset of the set of requests,
identifying dependency relationships between requested computations;
retrieving previously computed roll-up values from a persistent leaf pool indexed to the dependency relationships; and
computing additional roll-up values without redundant computation of intermediate results; and
evaluate the query based at least in part on a set of results obtained based on the evaluating of the set of requests; and
a memory coupled to the processor and configured to provide the processor with instructions.

2. The system of claim 1, wherein the data structure is a tree structure.

3. The system of claim 2, wherein:
generating the data structure comprises determining a set of leaf values to be used in connection with evaluating the query, and determining a relationship between leaf values in the set of leaf values; and
the relationships between leaf values are associated with computation dependencies used to eliminate redundant roll-up computations.

4. The system of claim 1, wherein the one or more processors are further configured to determine, based at least in part on the data structure, the plurality of account groups, wherein the plurality of account groups is independent and without a dependency across any two account groups in the plurality of account groups.

5. The system of claim 1, wherein the data structure is generated for each of the one or more dimensional subspaces, and the one or more dimensional subspaces have no overlap with respect to each other.

6. The system of claim 1, wherein at least a subset of the plurality of account groups is processed in parallel.

7. The system of claim 1, wherein the result data is determined without redundant computation of intermediate results with respect to which a set of subsequent computations have a dependency.

8. The system of claim 1, wherein evaluating the query with respect to the plurality of account groups comprises:
computing a plurality of roll-up values based on values for one or more leaves or nodes in the data structure;
determining at least a subset of the plurality of roll-up values that corresponds to unique combinations of the one or more leaves or nodes in the data structure; and
storing, in a leaf pool, the subset of the plurality of roll-up values corresponding to the unique combinations of the one or more leaves or nodes.

9. The system of claim 8, wherein the evaluating the query with respect to the plurality of account groups comprises:
for each roll-up value to be computed,
determining whether the roll-up value is dependent on one or more previously computed roll-up values stored in the leaf pool; and
in response to determining that the roll-up value is dependent on the one or more previously computed roll-up values stored in the leaf pool, retrieving the one or more previously computed roll-up values from the leaf pool and computing the roll-up value based at least in part on the one or more previously computed roll-up values.

10. The system of claim 8, wherein for each roll-up value stored in the leaf pool, storing the roll-up value comprises storing an indication of a leaf or a node of the data structure on which the roll-up value depends.

11. The system of claim 10, wherein the node of the data structure corresponds to a previously computed roll-up value.

12. The system of claim 10, wherein the storing the indication of the leaf or the node of the data structure on which the roll-up value depends comprises updating a leaf pool index that identifies a combination of leaves or nodes on which a particular roll-up value depends.

13. The system of claim 1, wherein evaluating the query with respect to the plurality of account groups comprises:
   determining one or more formulas in the query;
   classifying a pattern for each of the one or more formulas; and
   for each of the one or more formulas,
      determining whether the pattern is a closed pattern or an open pattern;
      in response to determining that the pattern is the open pattern, executing the formula; and
      in response to determining that the pattern is the closed pattern, determining one or more accounts on which the formula depends, apply a unary or binary operation on top of children data for the unary or binary operation.

14. The system of claim 13, wherein the closed pattern corresponds to a formula that can only be evaluated to non-empty for only locations in the data structure comprising data.

15. The system of claim 13, wherein the open pattern corresponds to a formula that can be evaluated to non-empty on a location of the data structure that has no data.

16. The system of claim 1, wherein the data structure is stored in local memory while the query is being evaluated.

17. The system of claim 1, wherein the query is indicative of a unit of measure for a dimension of the result data.

18. The system of claim 1, wherein the query defines one or more boundary conditions for the result data.

19. A method, comprising:
   receiving, by one or more processors, a query that is indicative of one or more properties of result data;
   determining, based at least in part on the query, one or more partitions of a hypercube, wherein:
      the partitions are non-overlapping dimensional subspaces of the hypercube; and
      each dimensional subspace is defined by a unique combination of coordinate values for a subset of the dimensions of the hypercube that are expected, based on the query semantics, to comprise information used in generating the result data for a response for the query;
   deconstructing the query into a set of requests, wherein the set of requests comprises requested computations, and each request is mapped to a respective one of the dimensional subspaces and is logically independent from the other requests in the set of requests;
   generating, for each dimensional subspace, a data structure comprising a set of data for that dimensional subspace, wherein the data structure is indicative of relationships among data in the set of data;
   using the data structure to evaluate the set of requests based at least in part on a plurality of account groups comprising values used in evaluating the query, wherein evaluating the set of requests comprises:
      for evaluation of at least a subset of the set of requests, identifying dependency relationships between requested computations,
      retrieving previously computed roll-up values from a persistent leaf pool indexed to the dependency relationships; and
      computing additional roll-up values without redundant computation of intermediate results; and
   evaluating the query based at least in part on a set of results obtained based on the evaluating of the set of requests.

20. A computer program product embodied in a non-transitory computer readable medium and comprising computer instructions for:
   receiving, by one or more processors, a query that is indicative of one or more properties of result data;
   determining, based at least in part on the query, one or more partitions of a hypercube, wherein:
      the partitions are non-overlapping dimensional subspaces of the hypercube;
      each dimensional subspace is defined by a unique combination of coordinate values for a subset of the dimensions of the hypercube that are expected, based on the query semantics, to comprise information used in generating the result data for a response for the query;
   deconstructing the query into a set of requests, wherein the set of requests comprises requested computations, and each request is mapped to a respective one of the dimensional subspaces and is logically independent from the other requests in the set of requests;
   generating, for each dimensional subspace, a data structure comprising a set of data of the one or more partitions for that dimensional subspace, wherein the data structure is indicative of relationships among data in the set of data;
   using the data structure to evaluate the set of requests based at least in part on a plurality of account groups comprising values used in evaluating the query, wherein evaluating the set of requests comprises:
      for evaluation of at least a subset of the set of requests, identifying dependency relationships between requested computations,
      retrieving previously computed roll-up values from a persistent leaf pool indexed to the dependency relationships; and
      computing additional roll-up values without redundant computation of intermediate results; and
   evaluating the query based at least in part on a set of results obtained based on the evaluating of the set of requests.

21. The system of claim 1, wherein the set of requests are independent sub-queries.

22. The system of claim 1, wherein the set of requests correspond to non-overlapping and independent groups of data.

23. The system of claim 1, wherein the query describes attributes of responsive data without specifying a particular set of intersections of the dataset to be queried.

24. The system of claim 1, wherein evaluating the query further comprises classifying each formula in the query as a closed pattern or an open pattern and, for closed patterns, applying a unary or binary operation to children data of the data structure.

25. The system of claim 24, wherein the open pattern corresponds to a formula that can be evaluated to non-empty on a location of the data structure having no data.

26. The system of claim 1, wherein the leaf pool comprises an index that identifies, for each roll-up value, the specific combination of leaves or nodes on which the roll-up value depends.

* * * * *